United States Patent
Kim et al.

(10) Patent No.: US 7,535,340 B2
(45) Date of Patent: May 19, 2009

(54) APPARATUS AND METHOD FOR PROCESSING AN APPLICATION PROGRAM-RELATED EVENT IN A WIRELESS TERMINAL

(75) Inventors: Jae-Ho Kim, Gumi-si (KR); Hyun-Ji Kim, Daegu (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 11/311,378

(22) Filed: Dec. 20, 2005

(65) Prior Publication Data

US 2006/0161650 A1 Jul. 20, 2006

(30) Foreign Application Priority Data

Dec. 20, 2004 (KR) .................. 10-2004-0108752
Dec. 7, 2005 (KR) .................. 10-2005-0118914

(51) Int. Cl.
*G08B 1/00* (2006.01)
*H04M 11/04* (2006.01)
*G04B 47/00* (2006.01)

(52) U.S. Cl. .................. 340/309.16; 340/309.7; 340/525; 340/7.55; 340/7.56; 340/7.51; 455/407; 455/412.2; 455/404.1

(58) Field of Classification Search .......... 340/309.16, 340/309.7; 455/412.1, 412.2
See application file for complete search history.

(56) References Cited

U.S. PATENT DOCUMENTS 6,088,731 A  7/2000 Kiraly et al.

(Continued)

FOREIGN PATENT DOCUMENTS

CN  1472670  2/2004

(Continued)

OTHER PUBLICATIONS

Luke Swartz, "Why People Hate the Paperclip: Labels, Appearance, Behavior And Social Responses To User Interface Agents", Thesis—Symbolic Systems Program, Stanford University, Jun. 12, 2003, Stanford University, Stanford, CA, USA.

(Continued)

*Primary Examiner*—Donnie L Crosland
(74) *Attorney, Agent, or Firm*—Roylance, Abrams, Berdo & Goodman, L.L.P.

(57) ABSTRACT

An apparatus and method is provided for processing an application program-related event in a wireless terminal. In the apparatus, a memory stores character user interface (UI) images associated with application program-related events. An event collection part collects the application program-related events occurring in the wireless terminal, and generates an event message for identifying its associated application program-related event. An agent control part, including a plurality of specialists for processing the application program-related events, selects a specialist mapped to the event message, sets an alarm event for an application program-related event of the selected specialist, and upon arrival of an occurrence time of the alarm event, selects and outputs a character UI for information on the alarm event and processes user feedback information for an associated event in response to the feedback information received from a user. An agent expression part outputs a character and text mapped to the application program-related event and the feedback information.

66 Claims, 25 Drawing Sheets

U.S. PATENT DOCUMENTS

| | | | |
|---|---|---|---|
| 2003/0046421 A1* | 3/2003 | Horvitz et al. | 709/238 |
| 2003/0224762 A1* | 12/2003 | Lau et al. | 455/412.2 |
| 2005/0075097 A1* | 4/2005 | Lehikoinen et al. | 455/414.1 |
| 2005/0130631 A1* | 6/2005 | Maguire et al. | 455/414.1 |
| 2006/0135136 A1* | 6/2006 | Kim et al. | 455/414.1 |
| 2006/0135219 A1* | 6/2006 | Kim et al. | 455/573 |
| 2006/0135220 A1* | 6/2006 | Kim et al. | 455/573 |
| 2006/0148528 A1* | 7/2006 | Jung et al. | 455/566 |
| 2006/0166708 A1* | 7/2006 | Kim et al. | 455/573 |
| 2006/0189313 A1* | 8/2006 | Kim et al. | 455/435.1 |
| 2006/0190595 A1* | 8/2006 | Kim et al. | 709/224 |
| 2006/0200746 A1* | 9/2006 | Kim et al. | 715/500.1 |
| 2006/0234728 A1* | 10/2006 | Kim et al. | 455/461 |
| 2006/0234759 A1* | 10/2006 | Kim et al. | 455/550.1 |

FOREIGN PATENT DOCUMENTS

| | | |
|---|---|---|
| EP | 1 309 158 A2 | 5/2003 |
| EP | 1 387 241 A2 | 2/2004 |
| EP | 1 309 158 A3 | 3/2006 |

OTHER PUBLICATIONS

W. Muller et al., "Face-To-Face With Your Assistant. Realization Issues Of Animated User Interface Agents For Home Appliances", Computers & Graphics 25 (2001), Aug. 2001, pp. 593-600, vol. 25, No. 4, Pergamon Press Ltd., Oxford, GB.

IBM, "Method For Notifying Caller Of Speed Dial Settings", IBM Technical Disclosure Bulletin, Sep. 1993, pp. 21-22, vol. 36, No. 09B, IBM Corp., New York, USA.

* cited by examiner

APPARATUS AND METHOD FOR PROCESSING AN APPLICATION PROGRAM-RELATED EVENT IN A WIRELESS TERMINAL

CROSS-REFERENCE TO RELATED APPLICATIONS

This application claims the benefit under 35 U.S.C. §119 (a) to Korean Patent Application No. 10-2004-0108752 entitled "Apparatus and Method for Processing an Application Program-Related Event in a Wireless Terminal" filed in the Korean Intellectual Property Office on Dec. 20, 2004, and Korean Patent Application No. 10-2005-0118914 filed in the Korean Intellectual Property Office on Dec. 7, 2005, the entire disclosures of which are incorporated herein by reference.

BACKGROUND OF THE INVENTION

1. Field of the Invention

The present invention generally relates to an agent apparatus and method for use in a wireless terminal. More particularly, the present invention relates to an apparatus and method for implementing a character agent function and processing an application program-related event.

2. Description of the Related Art

Conventionally, a wireless terminal denotes a portable device carried by a user, and its representative device is a wireless phone. The wireless phone can serve various supplementary functions as well as a basic phone function. Wireless phones with the supplementary functions may include a camcorder phone with a camera, a television (TV) phone through which TV can be watched, a Moving Picture Experts Group (MPEG) layer 3 (MP3) through which an MP3 music file can be listened to, a digital multimedia broadcasting (DMB) phone through which satellite broadcasting and/or terrestrial broadcasting programs can be watched, and so on. That is, it is a trend that products with supplementary functions that are capable of processing multimedia data are becoming widely used as current wireless phones.

The wireless terminals with such various supplementary functions conventionally include a liquid crystal display (LCD). Various display methods for effectively displaying information on a display unit of the LCD are being developed such that a user can easily recognize various supplementary functions, states of the wireless terminal, and so on. The wireless terminals are also being developed such that various types of user data can be displayed. Currently, user data displayed in the wireless terminals is mainly configured by visual image data such as photo data, character images, animations, and so on. Avatar image data is included in the user data, and wireless terminals using the avatar image data are being developed.

Accordingly, a need exists for a system and method for effectively and efficiently processing any number of application program-related events in a wireless terminal by incorporating display data.

SUMMARY OF THE INVENTION

It is, therefore, an object of the present invention to substantially solve the above and other problems, and provide an apparatus and method that can express a program-related event through a character agent function when the program-related event occurs in a wireless terminal. It is another object of the present invention to provide an apparatus and method that can analyze a program-related event occurring in a wireless terminal to select and express a character user interface (UI) provided in an optimum specialist.

It is yet another object of the present invention to provide an apparatus and method that can select a character user interface (UI) to express a program-related event occurring in the wireless terminal under control of a controller.

According to one aspect of the present invention, an apparatus is provided for processing an application program-related event in a wireless terminal. A memory stores character user interface (UI) images associated with application program-related events. An event collection part collects the application program-related events occurring in the wireless terminal, and generates an event message for identifying its associated application program-related event. An agent control part, including a plurality of specialists for processing the application program-related events, selects a specialist mapped to the event message, sets an alarm event for an application program-related event of the selected specialist, and upon arrival of an occurrence time of the alarm event, selects and outputs a character UI for information on the alarm event and processes user feedback information for an associated event in response to the feedback information received from a user. An agent expression part outputs a character and text mapped to the application program-related event and the feedback information.

According to another aspect of the present invention, a method is provided for processing an application program-related event in a wireless terminal. If an alarm event occurs, a type of the alarm event is determined. An application program-related record for the alarm event is analyzed, and a character and text mapped to the analysis result for the application program-related record is expressed.

BRIEF DESCRIPTION OF THE DRAWINGS

The above and other objects and advantages of the present invention will become more clearly understood from the following detailed description taken in conjunction with the accompanying drawings, in which.

Throughout the drawings, the same drawing reference numerals will be understood to refer to the same elements, features, and structures.

DETAILED DESCRIPTION OF THE EXEMPLARY EMBODIMENTS

Figure 1:
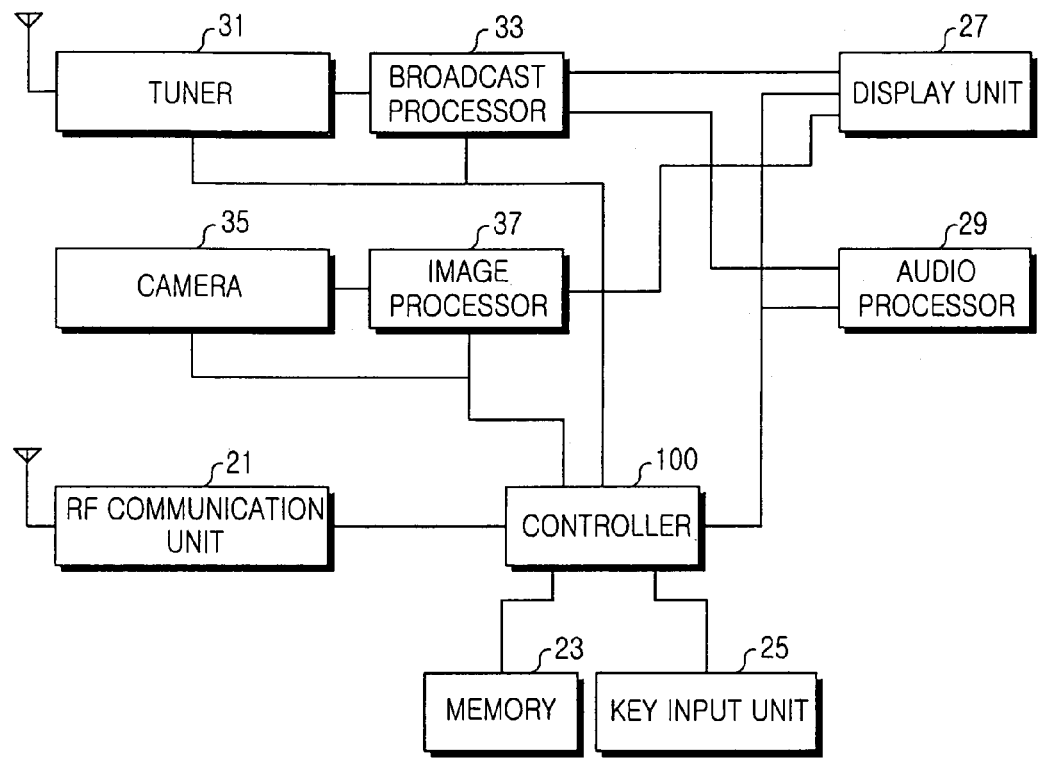
FIG. 1 is a block diagram illustrating a structure of a wireless terminal in accordance with an embodiment of the present invention.

Exemplary embodiments of the present invention will now be described in detail herein below with reference to the accompanying drawings. In the drawings, the same or similar elements are denoted by the same reference numerals even though they are depicted in different drawings. In the following description, specific details such as types of events, information necessary for agent expression, and so on are provided for a better understanding of the present invention. Those skilled in the art will appreciate that the present invention can be easily implemented through various modifications without the specific details.

Hereinafter, an alarm event may be a timer event. The timer event occurs when a set occurrence time is reached. Hereinafter, an alarm and an alarm event may be used to have the same meaning.

FIG. 1 is a block diagram illustrating a structure of a wireless terminal for expressing a character agent according to an event occurring therein in accordance with an embodiment of the present invention. The structure of FIG. 1 comprises an RF communication unit 21, a memory 23, a key input unit 25, a display unit 27, an audio processor 29, a tuner 31, a broadcast processor 33, a camera 35, an image processor 37, and a controller 100. Referring to FIG. 1, the radio frequency (RF) communication unit or communicator 21 performs a wireless communication function of the wireless terminal. The RF communicator 21 includes an RF transmitter for up converting and amplifying a frequency of a signal to be transmitted, an RF receiver for low noise amplifying a received signal and down converting a frequency of the received signal, and so on. The key input unit 25 is provided with keys for inputting number and letter information and function keys for setting various functions. Moreover, the key input unit 25 is provided with keys for controlling a character agent on an event-by-event basis in accordance with an embodiment of the present invention.

The memory 23 can be configured by program and data memories. The program memory stores programs for processing a call of the wireless terminal and programs for controlling agent expression for events occurring in accordance with an embodiment of the present invention. The data memory temporarily stores data generated in operation. Moreover, the data memory is provided with a character memory for storing character images for agent expression in accordance with an embodiment of the present invention. The character memory can operate with a file system, and can have an index of a character-by-character memory (or file system). The character memory can be configured in various forms for enabling operations, facial expressions, and object representations of character components. Character information can be stored in the character memory according to an agent expression form. A text memory for storing text for agent expression is provided. The text memory can store associated content according to an occurred event or feedback. Program execution records and morning call change records can be stored and occurred events can be stored on a type-by-type basis.

The controller 100 performs a function for controlling the overall operation of the wireless terminal. Moreover, the controller 100 is provided with a modulator-demodulator (MODEM) for modulating/demodulating a signal and a coder-decoder (CODEC) for coding/decoding a signal, thereby performing a function for coding and modulating a signal to be transmitted and a function for demodulating and decoding a received signal. Here, the controller 100 may be a mobile station modem (MSM) chip, but is not limited thereto. The controller 100 controls operations of communication mode, camera mode, and broadcasting reception mode in response to mode selected by a user. A data processor is independently configured to separate the MODEM and the CODEC from the controller 100. The data processor can be placed between the RF communicator 21 and the controller 100. In accordance with an embodiment of the present invention, the controller 100 collects an event according to the operation of the wireless terminal, controls an agent according to the collected event, and expresses a result of processing and a state of the event using an agent. Here, the agent expression can be displayed after an associated character and text are selected from the memory 23. An associated character and text can be displayed according to a feedback.

At the time of the user's camera mode selection, the camera 35 is started by the controller 100 and generates an image capture signal in the camera mode. The image processor 37 scales the image capture signal from the camera 35 according to a size of the display unit 27 in the camera mode, and encodes and stores the image capture signal in storage mode according to a set scheme. In mode for reproducing received or stored image data, the image processor 37 performs a function for decoding encoded image data.

In the broadcasting reception mode, the tuner 31 selects and receives a broadcast signal of a channel set under control of the controller 100. The broadcast processor 33 demodulates and decodes the broadcast signal of the selected channel, and outputs the demodulated and decoded image signal to the display unit 27. An audio signal is output to an audio processor 29. Here, the broadcast signal may be a satellite broadcast signal or a terrestrial broadcast signal.

Under the control of the controller 100, the display unit 27 can display menus according to the operation of the wireless terminal. When an event occurs, the display unit 27 displays an output character mapped to the event. Moreover, the display unit 27 displays an image signal output from the image processor 37 or the broadcast processor 33 in the camera mode or the broadcasting reception mode.

Under the control of the controller 100, the audio processor 29 processes an audio signal generated in the communication mode. Under the control of the image processor 37, the audio processor 29 processes an audio signal generated during an image capture operation in the camera mode. The audio processor 29 processes a broadcast audio signal received under the control of the broadcast processor 33 in the broadcasting reception mode.

A structure for processing the camera signal and/or broadcast signal can be omitted from the wireless terminal with the above-described structure. In this case, a character agent function for an event can be performed in accordance with an embodiment of the present invention. In the following description, it is assumed that the character is an avatar. Accordingly, character agent control for an event of the wireless terminal will be described as avatar agent control, but can be equally applied for all images as well as the avatar.

Figure 2:
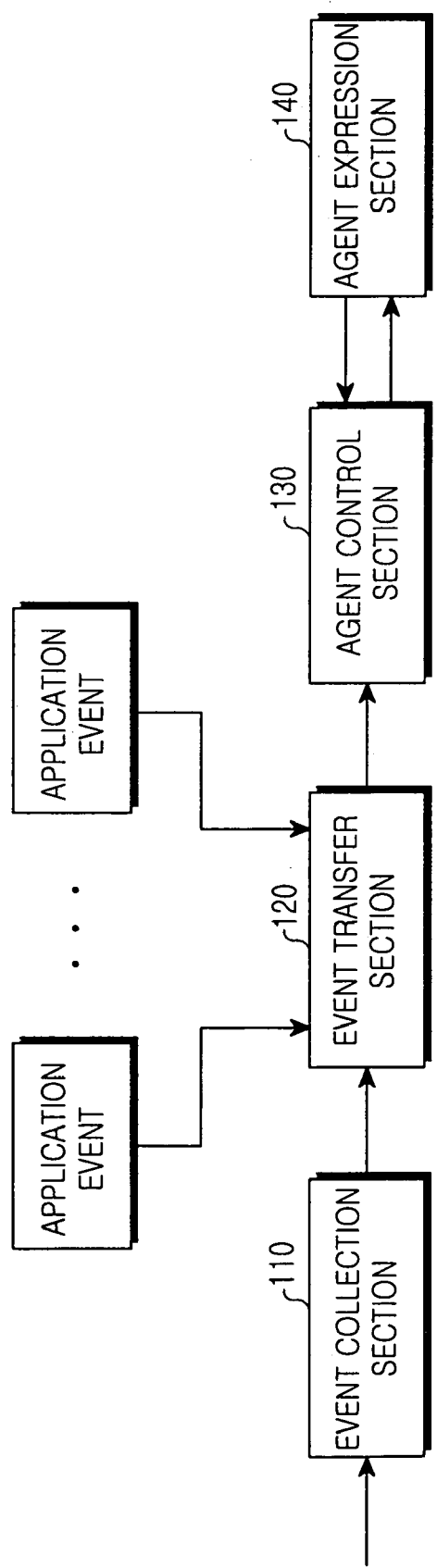
FIG. 2 is a functional block diagram illustrating a controller of the wireless terminal in accordance with an embodiment of the present invention.

FIG. 2 is a functional block diagram illustrating a controller of the wireless terminal in accordance with an embodiment of the present invention. An example of the functional block configuration as illustrated in FIG. 2 is disclosed in Korean Patent Application Serial No. 10-2004-0078470, entitled "Intelligent Terminal Using an Artificial Intelligence Agent", filed by Kim Jaeho, et al., the entire disclosure of which is incorporated herein by reference. The following description will be given with reference to content disclosed in Korean Patent Application Serial No. 10-2004-0078470. To implement embodiments of the present invention, the controller 100 may control a single agent system without functional blocks such as an event collection part, an event delivery part, an agent control part, and an agent expression part.

In FIG. 2, the controller comprises an event collection section 110, an event transfer section 120, an agent control section 130, and an agent expression section 140. Referring to FIG. 2, the event collection section or part 110 performs a function for collecting events occurring in the wireless terminal. Here, the events include substantially all events of the wireless terminal such as a communication event of the wireless terminal, an event occurring in the wireless terminal itself, an event occurring according to the user's request, and an event occurring when a multimedia function of the wireless terminal is performed. That is, the events collected by the event collection part 110 are events defined in the wireless terminal. The event collection part 110 generates an event message for identifying an occurred event, and provides the event message to the event delivery section or part 120.

The event delivery part 120 performs a function for delivering the event message received from the event collection part 110 to an associated client. In accordance with an embodiment of the present invention, it is assumed that the event delivery part 120 delivers the event message only to the agent control section or part 130. When a different component makes an event message delivery request, the event message can be delivered to the different component. Moreover, the event delivery part 120 receives user-defined events undefined in the wireless terminal as well as the events received from the event collector 100 and delivers the received events to the agent control part 130. Here, the user-defined events as described above are referred to as the application events. The application events may occur in games, other application programs, and web service programs.

When receiving an event message from the event delivery part 120, the agent control part 130 stores the received event message in an internal buffer, and analyzes the event message to set a user interface (UI) such that an associated character agent can be expressed. Here, the event delivered from the event delivery part 120 may be events of the wireless terminal (e.g., events received from the event collection part 110) and application events. In the following, a description is focused on the agent expression for an event received from the event collection part 110. The agent control part 130 is provided with a plurality of specialists. The agent control part 130 controls these specialists, selects a specialist mapped to an occurred event, and performs an agent control function. When an event is received, the agent control part 130 notifies suitable specialists of event occurrence according to the received event, and sends a UI request to the agent expression section or part 140 such that agent expression of the finally selected specialist can be displayed. In response to feedback information of the user received from the agent expression part 140, the user feedback information for an associated event is processed.

The agent expression part 140 displays the character expression for an associated event according to agent UI information output from the agent control part 130. At this time, the agent expression part 140 manages a plurality of avatar UIs to be displayed on the display unit 27. The agent control part 130 performs a control operation such that an avatar mapped to requested UI information can be displayed. When the user generates the feedback information in a state in which the avatar has been displayed according to the occurred event, the agent expression part 140 sends the received feedback information to the agent control part 130. The agent control part 130 performs agent control according to the user feedback information received from the agent expression part 140.

When only the events of the wireless terminal collected by the event collection part 110 are processed in the structure of FIG. 2, the event delivery part 120 can be omitted. Here, the internal buffer of the agent control part 130 is referred to as a blackboard, as described in greater detail below.

Next, the structure and operation of the agent control part 130 will be described in more detail. The agent control part 130 comprises a plurality of specialists for receiving a call according to an event type, performing a preset special task, and outputting a task result, a blackboard used to store various information including information of event messages, a supervisor for selecting one specialist when a plurality of specialists output valid results, an avatar quotient memory for storing an avatar quotient according to an occurred event, a specialist manager for selecting associated specialists from a list of event-by-event specialists at the time of event occurrence and controlling an agent according to an event, and so on.

The specialists make a contribution to solving a problem and have specially defined parts. The specialists record a solution of an intermediate step in the blackboard and also express a priority and user preference for the solution of the intermediate step. The specialists identify a state of the blackboard, make a request for computing the priority and user preference, and record the solution of the intermediate step in the blackboard.

The blackboard is a working environment and information space for communication between the specialists. Basically, the specialists can record the solution of the intermediate step. Advantages of a pattern of the blackboard are as follows. First, many specialists of different types can be easily integrated. Second, the specialists can be independently modularized and developed because they seldom affect each other. Third, flexibility is provided for many variations (such as a change of a specialist algorithm or an addition of a new specialist).

When at least two specialists are selected in relation to one event, the specialist manager requests that the supervisor select a specialist most closely related to the received event. The supervisor analyzes data of the blackboard, a basically designated priority according to an event, a user preference, and so on, thereby selecting the specialist with the closest relation.

An internal quotient of an avatar is varied according to an agent function and various events occurring in the wireless terminal and the feedback information of the user. Also, many application events capable of using the avatar quotient affect the avatar quotient. As the internal quotient is varied, an avatar interface is varied. As a period of time elapses, the appearance in which the avatar is brought up is viewed. This is a growth concept of the avatar. In accordance with an embodiment of the present invention, the avatar growth is introduced into the wireless terminal based on an artificial intelligence (AI) agent system. For this, the wireless terminal proposes and reports many actions to the user on the basis of various events occurring in the wireless terminal. Accordingly, the user can use the terminal more effectively and enjoyably. On the basis of these events and the user's feedback action, the avatar quotient is varied.

Table 1 shows cases by way of example, in accordance with an embodiment of the present invention. Table 1 shows event use cases, case classification, event determination times, action (processing) times of specialists, the number of occurrences, times, event parameters (necessary information), conditions, UI text, user options, and so on. Other cases can be added to the above cases or some cases can be deleted.

TABLE 1

| ID | Use Case | Class | Info necessary for controller | UI Text | Option |
|---|---|---|---|---|---|
| 29 | Recommend the execution of program when a pattern for running an app is detected at a specific time. | APP | AP_APP_START/ ApplicationUID | Would you like to run [Program] same as usual? | Yes/No |
| 30 | Recommend morning call setup before the user goes to sleep. | APP | AP_MORNINGCALL_ADD | It's time to set up a morning call. Would you like to set up it now? | Yes/No |
| 38 | Recommend an execution of the next predicted program after an app program is ended. | APP | AP_APP_START/ AP_APP_EXIT ApplicationUID | Usually you continue with [Program], would you like to use it? | Yes/No |
| 41 | Recommend use of a Help function when an app is first used. | APP | AP_APP_START/ ApplicationUID | [Program] is first used. Would you like to see a Help menu? | Yes/No |
| 44 | Recommend use of an app not recently used. | APP | AP_APP_START/ ApplicationUID | You have seldom used [Program] recently. Would you like to use it? | Yes/No |

TABLE 1-continued

| ID | Use Case | Class | Info necessary for controller | UI Text | Option |
|---|---|---|---|---|---|
| 45 | Recommend use of an app not generally used. | APP | AP_APP_START/ ApplicationUID | You have almost not used [Program]. Would you like to use it? | Yes/No |

An operation for processing an application program-related event in a process for processing an event in a wireless terminal in accordance with features of the present invention will now be described in greater detail.

Figure 3:
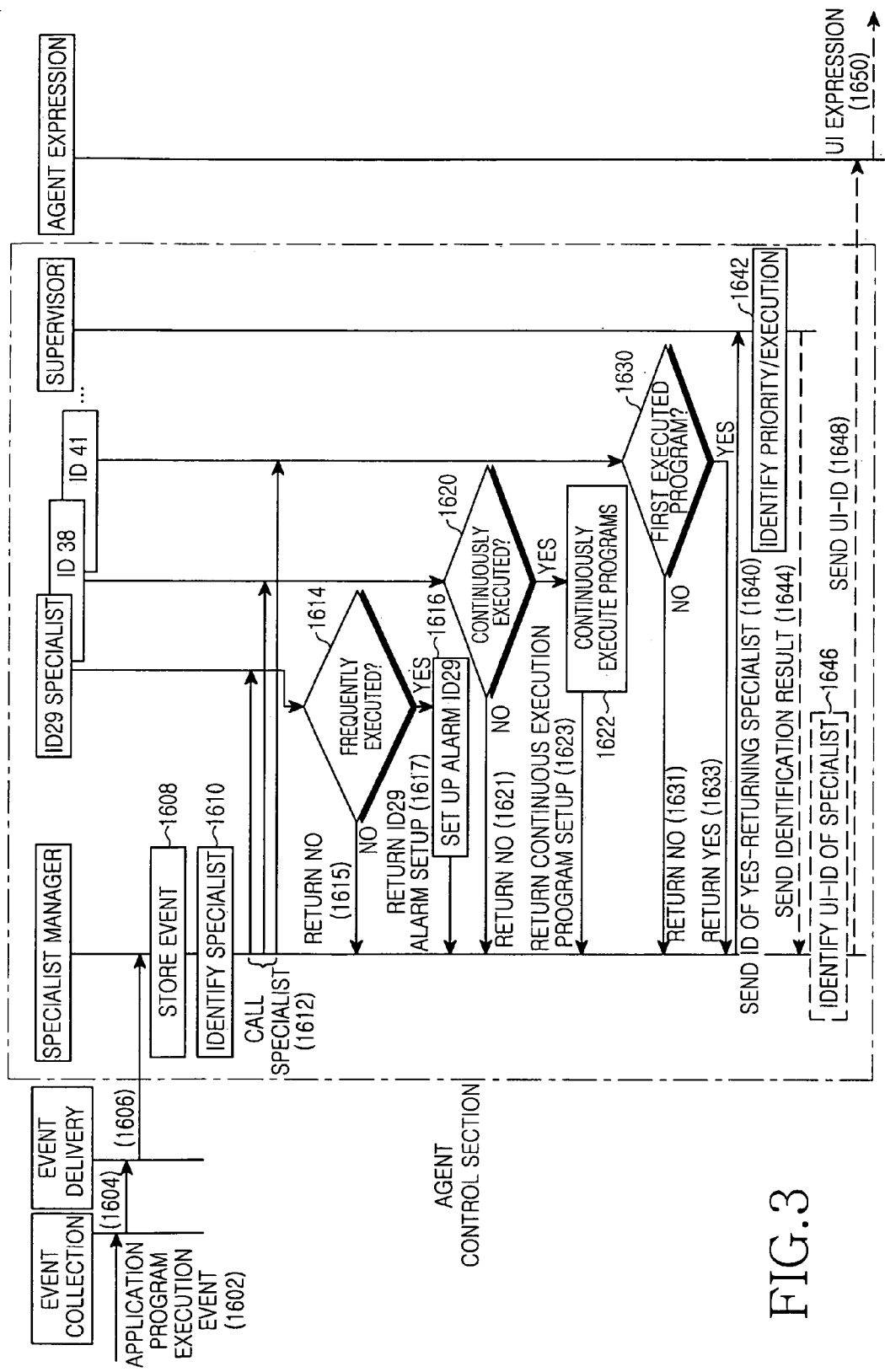
FIG. 3 is a flowchart illustrating an operation for processing a program execution event using a character agent in accordance with an embodiment of the present invention.

FIG. 3 is a flowchart illustrating an operation for processing a program execution event using a character agent in accordance with an embodiment of the present invention. Referring to FIG. 3, the event collection part collects an occurred event when an application program execution event occurs in step 1602, and provides the occurred event to the event delivery part in step 1604. The event delivery part provides the occurred event to the specialist manager of the agent control part in step 1606. The specialist manager stores the received application program execution event in the blackboard in step 1608. Then, the specialist manager identifies specialists to be called from an internal specialist list at the time of the application program execution event in step 1610, and calls the identified specialists in step 1612. FIG. 3 illustrates an example in which specialists of IDs 29, 38, and 41 are called in step 1612.

Among the called specialists, the specialist of ID 29 is provided to recommend an execution of an associated application program within a specific time range of the next predetermined period when the associated application program has been frequently executed at a specific time or on a specific day of the week (i.e., at least a predetermined number of times within the specific time range in every predetermined period). The specific time range may be a range of from a first predetermined time, which is (30 minutes) earlier than the end time of the associated application program, to the program end time, a range of from the program end time to a second predetermined time, which is (30 minutes) later than the program end time, or a range of from the first predetermined time to the second predetermined time.

In step 1614, the specialist of ID 29 identifies the blackboard and determines if the associated application program has been frequently executed at the specific time or on the specific day of the week (within a specific time range in every predetermined period), for example, at least three times corresponding to a threshold number of times. If the application program has not been executed at least a threshold number of times within the specific time range in every predetermined period as a determination result, the specialist of ID 29 proceeds to step 1615 to return the 'NO' signal to the specialist manager. However, if the application program has been executed at least a threshold number of times within the specific time range in every predetermined period as a determination result, the specialist of ID 29 proceeds to step 1616. The specialist of ID 29 sets up an ID29 alarm in step 1616 and then proceeds to step 1617 to return an 'ID29 alarm setup' signal to the specialist manager. For example, when the user has executed the associated application program at 10:10 a.m. on Monday in the first week, at 10:20 a.m. on Monday in the second week, and at 10:15 a.m. on Wednesday in the third week, it can be determined that the associated application program has been executed at least a predetermined number of times within a specific time range in every predetermined period (e.g., 7 days). In this case, the 'ID29 alarm' is set up and the 'ID29 alarm setup' signal is returned to the specialist manager.

In the ID29 alarm setup, an alarm occurrence time (i.e., a predetermined time within a specific time range of the next predetermined period) is set and an associated application program is registered for the ID29 alarm.

Among the called specialists, the specialist of ID 38 is provide to identify a specific application program to be continuously executed and set the specific application program as a continuous execution application program after a predetermined application program is ended. In step 1620, the specialist of ID 38 identifies the blackboard and determines if an associated application program has been executed subsequent to the previously ended application program. For example, this determination can be made by analyzing application program execution record information of a predetermined period (e.g., one week) and determining if a currently executed application program (or a second application program) has been successively executed at least a preset number of times (e.g., at least three times) after a previously executed application program (or a first application program) is ended. If the currently executed application program (or the second application program) subsequent to the previously executed application program (or the first application program) has not been successively executed at least a preset number of times as a determination result, the specialist of ID 38 proceeds to step 1621 to return the 'NO' signal to the specialist manager. However, if the currently executed application program (or the second application program) subsequent to the previously executed application program (or the first application program) has been successively executed at least a preset number of times, the specialist of ID 38 proceeds to step 1622 to set the previously executed application program (or the first application program) and the currently executed application program (or the second application program) as continuous programs. The specialist of ID 38 proceeds to step 1623 to return a 'continuous execution program setup' signal to the specialist manager. The continuous execution program setup indicates that the currently executed application program (or the second application program) is set as the continuous execution program subsequent to the previously executed application program (or the first application program).

Among the called specialists, the specialist of ID 41 is used to recommend an execution of a Help function when an application program is first executed. In step 1630, the specialist of ID 41 determines if an associated application program is first executed. This determination can be made by analyzing application program execution record information and identifying application program execution records. If the application program is not first executed, the specialist of ID 41 proceeds to step 1631 to return the 'NO' signal to the specialist manager. However, if the application program is first executed, the specialist of ID 41 returns the 'YES' signal to the specialist manager in step 1633.

Figure 23A:
FIGS. 23A-23C illustrate exemplary screens in an operation for processing an alarm for recommending an execution of a Help function when a program is first used in accordance with an embodiment of the present invention.
Figure 23B:
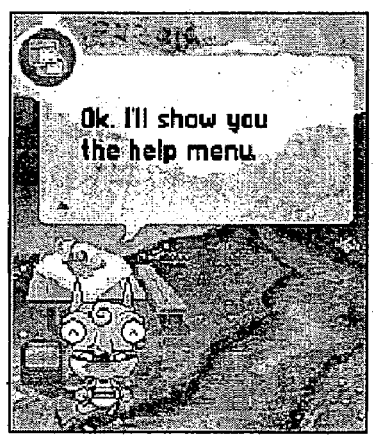
Figure 23C:

When a called specialist makes the return, the specialist manager provides the supervisor with an ID of the specialist returning the 'YES' signal (e.g., Specialist ID 41 of FIG. 3) in step 1640. Then, the supervisor identifies priorities of associated specialists or identifies the execution of an associated specialist when the number of specialists returning 'YES' is one in step 1642. In step 1644, the supervisor sends, to the specialist manager, a result of the identification for the highest priority specialist or the execution of the associated specialist. Then, the specialist manager identifies a UI ID of the highest priority specialist or the specialist to be executed in step 1646 and sends the identified UI ID to the agent expression part in step 1648. In step 1650, the agent expression part expresses an associated UI. When a UI mapped to Specialist ID 41 is expressed, text for recommending use of a preset Help function for an associated application program can be expressed as illustrated in FIG. 23(A). According to the user's feedback, a character with a happy expression and/or text for identifying an execution of the Help function is expressed as illustrated in FIG. 23(B). According to the user's feedback, a character with a sad expression and/or text are expressed which indicate that the Help function is not executed as illustrated in FIG. 23(C). When a predetermined time elapses or a predetermined key is input, the expressed character and/or text disappear.

Figure 4:
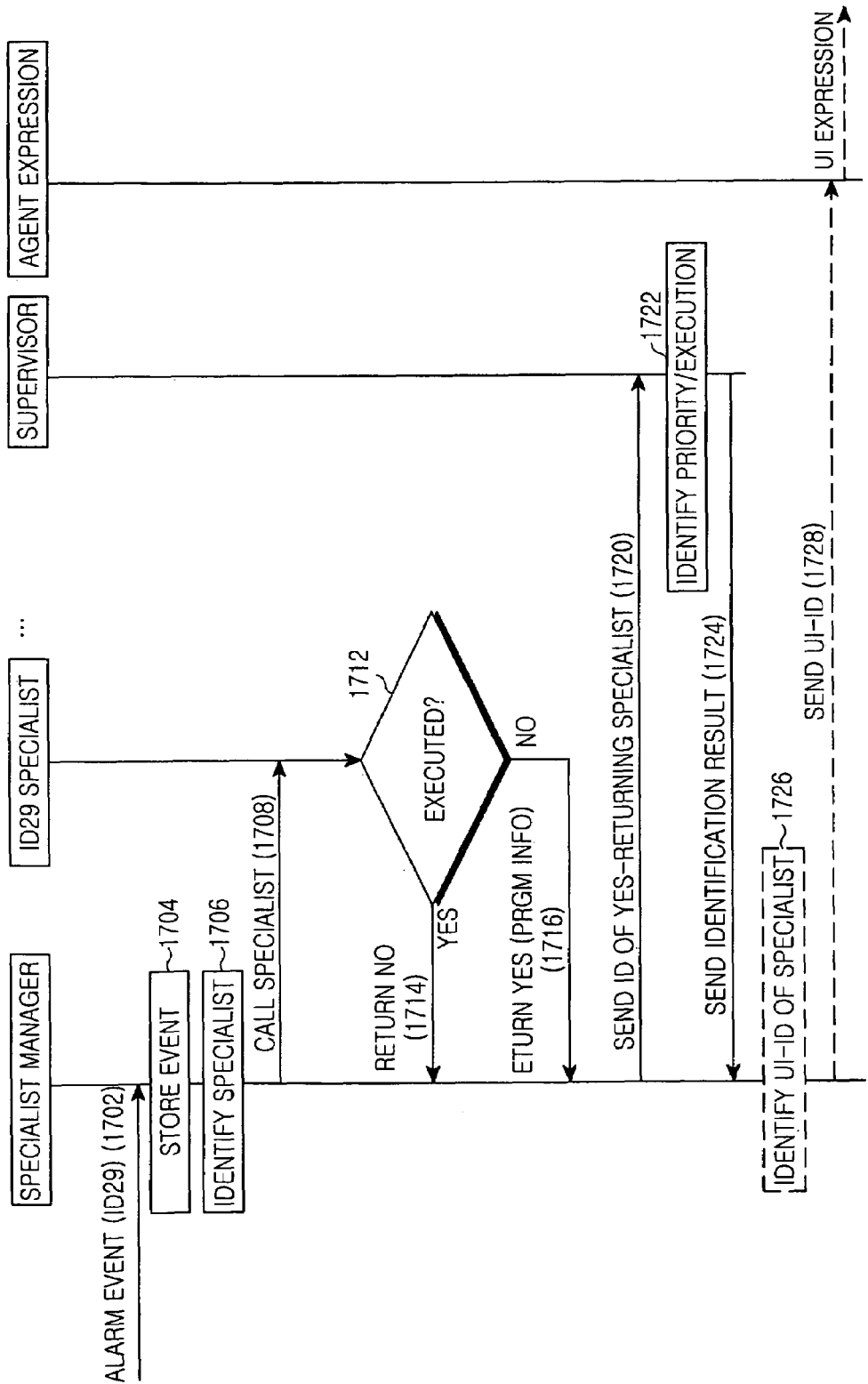
FIG. 4 is a flowchart illustrating an operation for processing an alarm event for recommending an execution of a set program using a character agent in accordance with an embodiment of the present invention.

FIG. 4 is a flowchart illustrating an operation for processing an alarm event for recommending an execution of a set program using a character agent in accordance with an embodiment of the present invention. The alarm event can be provided to the agent control part through the event collection part and the event delivery part as illustrated in FIG. 3.

An operation for processing the alarm event for recommending an execution of a specific program within a specific time range will be described with reference to FIG. 4. When an alarm event of ID 29 is delivered in step 1702, the specialist manager stores the received alarm event in the blackboard in step 1704. Then, the specialist manager identifies specialists to be called from an internal specialist list at the time of the ID29 alarm event in step 1706 and calls the identified specialists in step 1708. (A specialist of ID 29 is called in FIG. 4.) The called ID29 specialist is provided to recommend an execution of the application program within a specific time range of the next predetermined period when the application program has been executed at least a threshold number of times within the specific time range in every predetermined period. Then, the ID29 specialist identifies execution records on an application program-by-application program basis through the blackboard and determines if the application program registered for the ID29 alarm has been executed within the specific time range in step 1712. If the associated application program has been executed as a determination result in step 1712, the ID29 specialist proceeds to step 1714 to return the 'NO' signal to the specialist manager. However, if the associated application program has not been executed, the ID29 specialist proceeds to step 1716 to return the 'YES' signal to the specialist manager. When the 'YES' signal is returned, information of the associated application program can also be returned.

Figure 21A:
FIGS. 21A-21C illustrate exemplary screens in an operation for processing an alarm event for recommending a program execution in accordance with an embodiment of the present invention.
Figure 21B:
Figure 21C:

When a called specialist (i.e., the ID29 specialist) makes the return, the specialist manager provides the supervisor with an ID of the specialist returning the 'YES' signal (i.e., Special ID 29) in step 1720. Then, the supervisor identifies priorities of associated specialists or identifies the execution of an associated specialist in step 1722. In step 1724, the supervisor sends, to the specialist manager, a result of the identification for the highest priority specialist or the execution of the associated specialist. Then, the specialist manager identifies a UI ID of the highest priority specialist or the specialist to be executed in step 1726 and sends the identified UI ID to the agent expression part in step 1728. Then, the agent expression part expresses an associated UI. When a UI ID mapped to Specialist ID 29 is sent, information of the associated application program is also sent. When the agent expression part expresses a UI, the information of the associated application program and text for recommending an execution of the associated application program can be expressed as illustrated in FIG. 21(A). According to the user's feedback, a character with a happy expression and/or text for approving an execution of the associated application program is expressed as illustrated in FIG. 21(B). According to the user's feedback, a character with a sad expression and/or text are expressed which indicate that the associated application program is not executed as illustrated in FIG. 21(C). When a predetermined time elapses or a predetermined key is input, the expressed character and/or text disappear.

Figure 5:
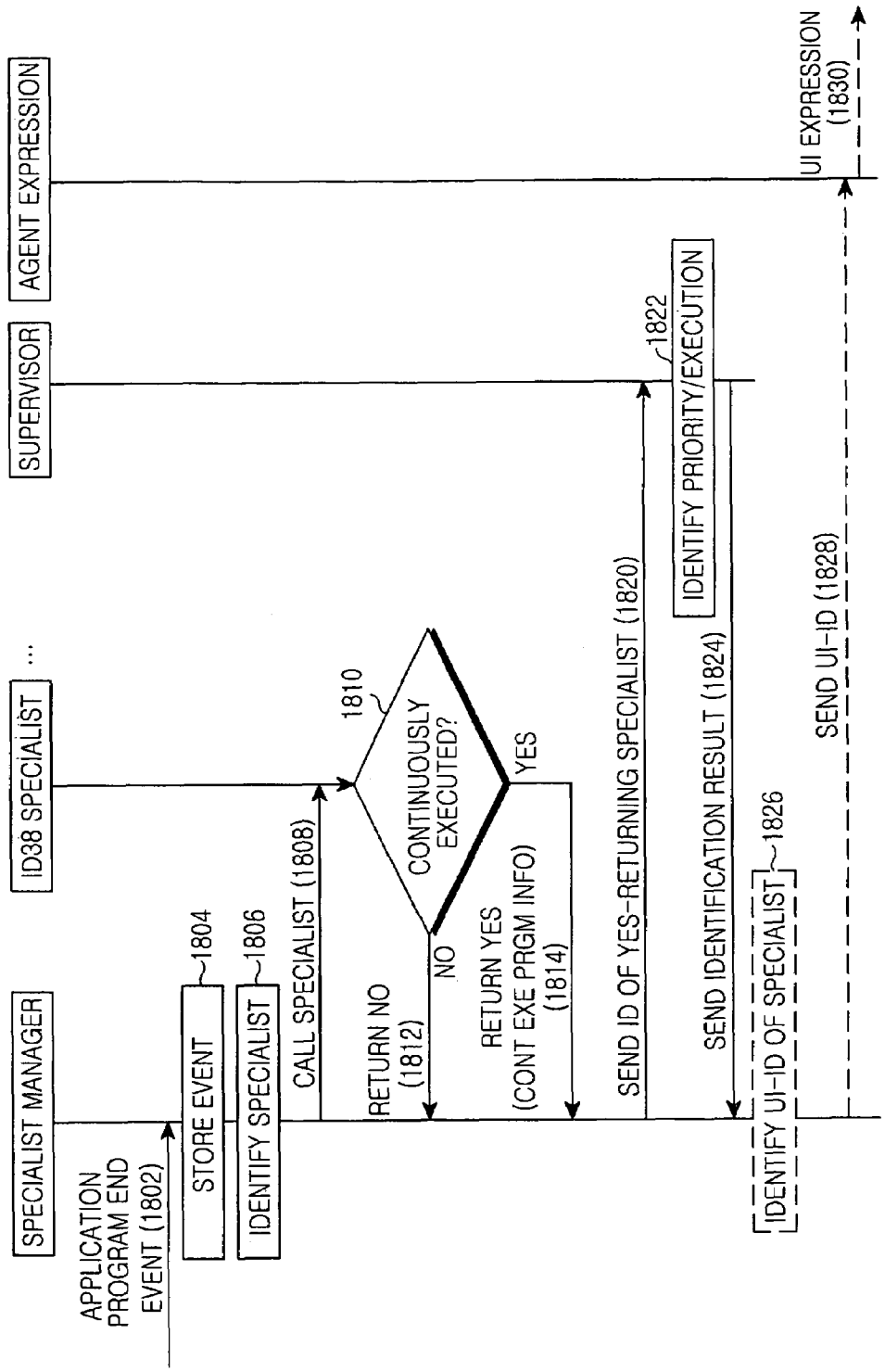
FIG. 5 is a flowchart illustrating an operation for recommending an execution of a specific program after a program is ended using a character agent in accordance with an embodiment of the present invention.

FIG. 5 is a flowchart illustrating an operation for recommending an execution of a specific program after a program is ended using a character agent in accordance with an embodiment of the present invention. An alarm event can be provided to the agent control part through the event collection part and the event delivery part as illustrated in FIG. 3.

An operation for recommending an execution of a specific program when the specific program set as a continuous execution application program is not executed after an associated application program is ended will be described with reference to FIG. 5. When an end event of the application program is delivered in step 1802, the specialist manager stores the received application program end event in the blackboard in step 1804. Then, the specialist manager identifies specialists to be called from an internal specialist list at the time of the application program end event in step 1806 and calls the identified specialists in step 1808. (A specialist of ID 38 is called in FIG. 5.) The called ID38 specialist is provided to recommend an execution of the application program to be continuously executed (used). Then, the ID38 specialist determines if an application program registered for the continuous execution (use) application program is present which is subsequent to the ended application program in step 1810. If an application program registered for the continuous execution application program is absent, the ID38 specialist proceeds to step 1812 to return the 'NO' signal to the specialist manager. However, if an application program registered for the continuous execution application program is present, the ID38 specialist proceeds to step 1814 to return the 'YES' signal to the specialist manager. When the 'YES' signal is returned, information of the continuous execution (use) application program can also be returned.

Figure 22A:
FIGS. 22A-22C illustrate exemplary screens in an operation for recommending an execution of a specific program after a program is ended in accordance with an embodiment of the present invention.
Figure 22B:
Figure 22C:

When a called specialist (i.e., the ID38 specialist) makes the return, the specialist manager provides the supervisor with an ID of the specialist returning the 'YES' signal (i.e., Special ID 38) in step 1820. Then, the supervisor identifies priorities of associated specialists or identifies the execution of an associated specialist in step 1822. In step 1824, the supervisor sends, to the specialist manager, a result of the identification for the highest priority specialist or the execution of the associated specialist. Then, the specialist manager identifies a UI ID of the highest priority specialist or the specialist to be executed in step 1826 and sends the identified UI ID to the agent expression part in step 1828. Then, the agent expression part expresses an associated UI. When a UI ID mapped to Specialist ID 38 is sent, information of the continuous execution application program is also sent. When the agent expression part expresses a UI, the continuous execution application program information and text for recommending an execution of the continuous execution application program can be expressed as illustrated in FIG. 22(A). According to the user's feedback, a character with a happy expression and/or text for approving an execution of the continuous execution application program is expressed as illustrated in FIG. 22(B). According to the user's feedback, a character with a sad expression and/or text are expressed which indicate that the continuous execution application program is not executed as illustrated in FIG. 22(C). When a predetermined time elapses or a predetermined key is input, the expressed character and/or text disappear.

Figure 6:
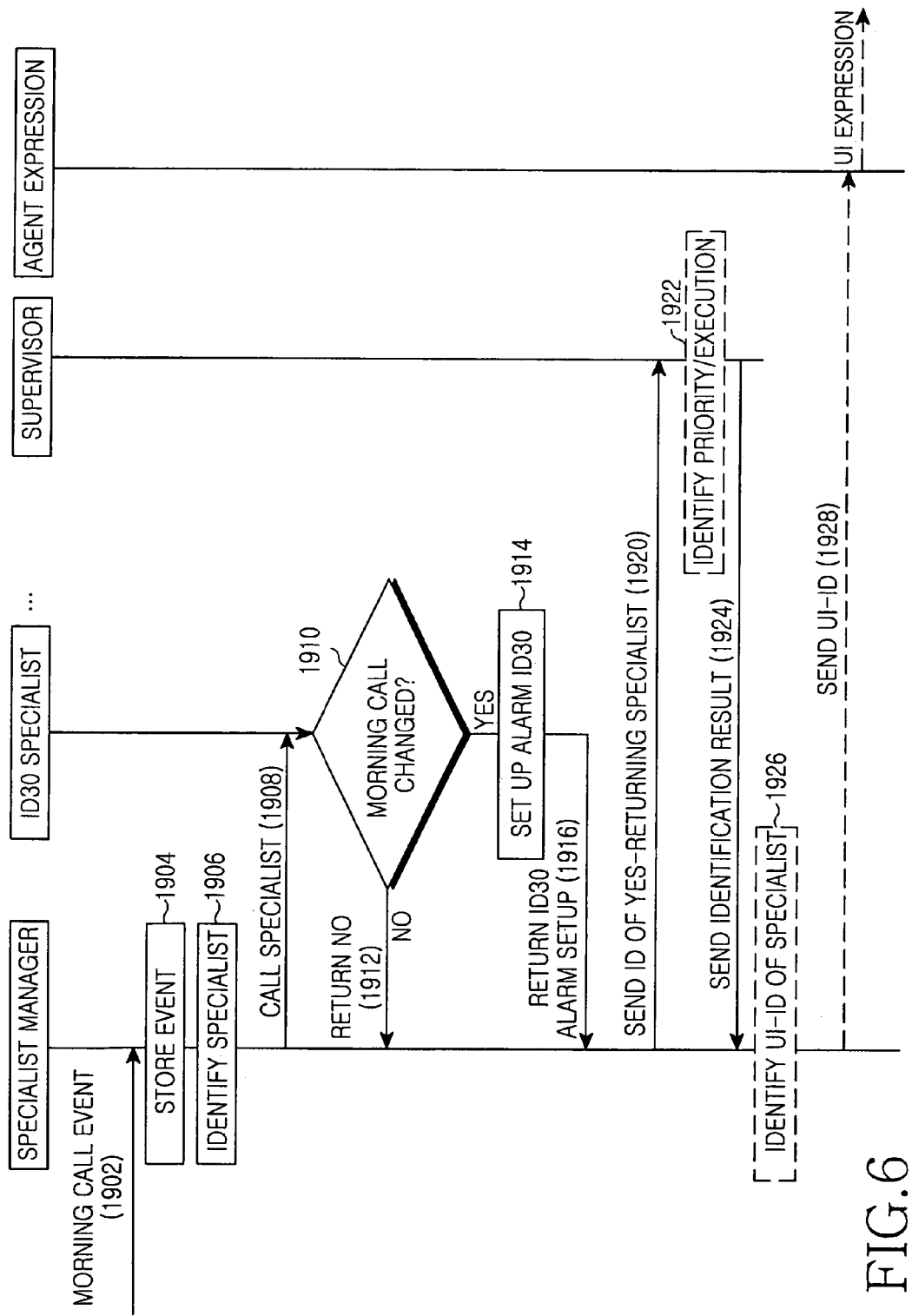
FIG. 6 is a flowchart illustrating an operation for setting up an alarm for recommending a morning call change using a character agent in accordance with an embodiment of the present invention.

FIG. 6 is a flowchart illustrating an operation for setting up an alarm for recommending a morning call change using a character agent in accordance with an embodiment of the present invention. Referring to FIG. 6, the event collection part collects an occurred event when a morning call change event occurs in step 1902. The specialist manager stores the received morning call change event in the blackboard in step 1904. Then, the specialist manager identifies specialists to be called from an internal specialist list at the time of the morning call change event in step 1906, and calls the identified specialists in step 1908. (A specialist of ID 30 is called in FIG. 6.)

The called ID30 specialist is provided to recommend a morning call change within a specific time range of the next predetermined period when the morning call has been previously and frequently changed at a specific time or on a specific day of the week (i.e., at least a predetermined number of times within the specific time range in every predetermined period) but has not been recently changed. The specific time range may be a range of from a first predetermined time, which is (30 minutes) earlier than a morning call change time, to the morning call change time, a range of from the morning call change time to a second predetermined time, which is (30 minutes) later than the morning call change time, or a range of from the first predetermined time to the second predetermined time.

In step 1910, the ID30 specialist identifies the blackboard and determines if the morning call has been frequently changed at the specific time or on the specific day of the week (within the specific time range in every predetermined period), for example, at least three times corresponding to a threshold number of times. If the morning call has not been changed at least a threshold number of times within the specific time range in every predetermined period as a determination result, the ID30 specialist proceeds to step 1912 to return the 'NO' signal to the specialist manager. However, if the morning call has been changed at least a threshold number of times within the specific time range in every predetermined period as a determination result, the ID30 specialist proceeds to step 1914. The ID30 specialist sets up an ID30 alarm in step 1914 and then proceeds to step 1916 to return an 'ID30 alarm setup' signal to the specialist manager. For example, when the user has made the morning call change at 10:10 a.m. on Monday in the first week, at 10:20 a.m. on Monday in the second week, and at 10:15 a.m. on Wednesday in the third week, it can be determined that the morning call has been changed at least a predetermined number of times within a specific time range in every predetermined period (e.g., 7 days). In this case, the 'ID30 alarm' is set up and the 'ID30 alarm setup' signal is returned to the specialist manager. In the ID30 alarm setup, an alarm occurrence time (i.e., a predetermined time within the specific time range of the next predetermined period or the last morning call change time within the specific time range of the next predetermined period) is set and a morning call program is registered for the ID30 alarm.

When the called ID30 specialist makes the return, the specialist manager provides the supervisor with an ID of the specialist returning the 'YES' signal in step 1920. In FIG. 6, the number of specialists called at the time of the morning call change is one in accordance with an embodiment of the present invention. In this case, a specialist ID to be sent from the specialist manager to the supervisor is absent because the ID30 specialist returns the 'NO' signal and the 'ID30 alarm setup' signal. In an alternative embodiment, the specialist can be configured such that it performs a suitable operation at the time of the morning call change event and returns the 'ID30 alarm setup' signal. In this case, the specialist manager can provide the supervisor with an ID of a specialist returning an associated 'ID30 alarm setup' signal in step 1920. Then, the supervisor identifies priorities of associated specialists or identifies the execution of an associated specialist in step 1922. The supervisor sends, to the specialist manager, a result of the identification for the highest priority specialist or the execution of the associated specialist in step 1924. Then, the specialist manager identifies a UI ID of the highest priority specialist or the specialist to be executed in step 1926 and sends the identified UI ID (for registering a morning call change alarm) to the agent expression part in step 1928. The agent expression part expresses an associated UI.

Figure 7:
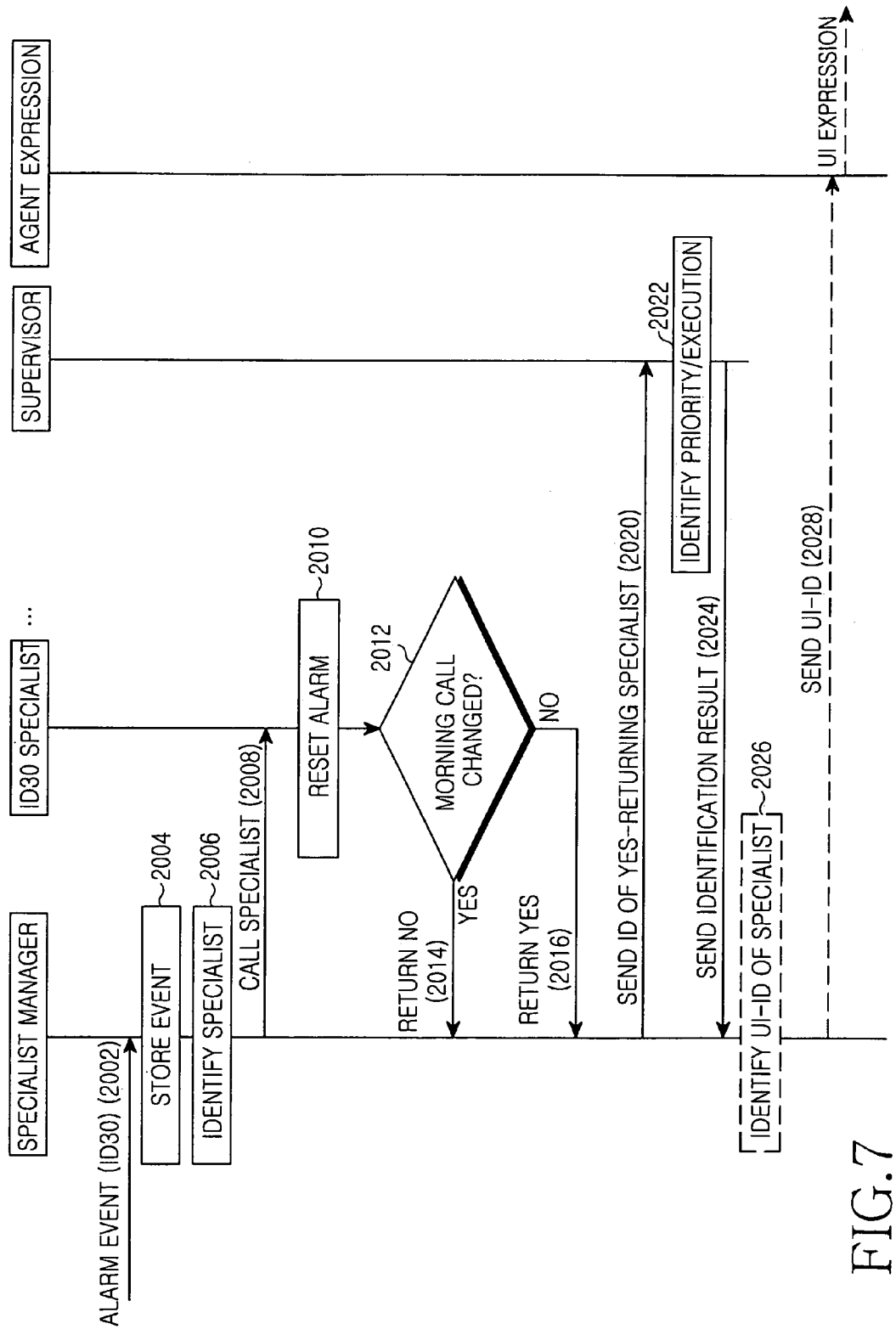
FIG. 7 is a flowchart illustrating an operation for processing an alarm event for recommending a morning call change using a character agent in accordance with an embodiment of the present invention.

FIG. 7 is a flowchart illustrating an operation for processing an alarm event for recommending a morning call change using a character agent in accordance with an embodiment of the present invention. An alarm event can be provided to the agent control part through the event collection part and the event delivery part.

An operation for recommending a morning call change at a specific time or on a specific day of the week of the next predetermined period when the morning call has been previously and frequently changed at the specific time or on the specific day of the week but has not been recently changed will be described with reference to FIG. 7. When an alarm event of ID 30 is delivered in step 2002, the specialist manager stores the received alarm event in the blackboard in step 2004. Then, the specialist manager identifies specialists to be called from an internal specialist list at the time of the ID30 alarm event in step 2006 and calls the identified specialists in step 2008. (A specialist of ID 30 is called in FIG. 7.)

The called ID30 specialist is provided to recommend a morning call change within the specific time range of the next predetermined period when the morning call has been changed at least a predetermined number of times within the specific time range in every predetermined period. In step 2010, the ID30 alarm is reset, for example, after N days (Alarm ID 30). This alarm reset is called and operated in a period of N days. Then, the ID30 specialist identifies morning call change records through the blackboard and determines if the morning call has been changed within the specific time range in step 2012. If the morning call has been changed within the specific time range as a determination result in step 2012, the ID30 specialist proceeds to step 2014 to return the 'NO' signal to the specialist manager. However, if the morning call has not been changed within the specific time range, the ID30 specialist proceeds to step 2016 to return the 'YES' signal to the specialist manager. When the 'YES' signal is returned, information of the associated morning call can also be returned.

Figure 24A:
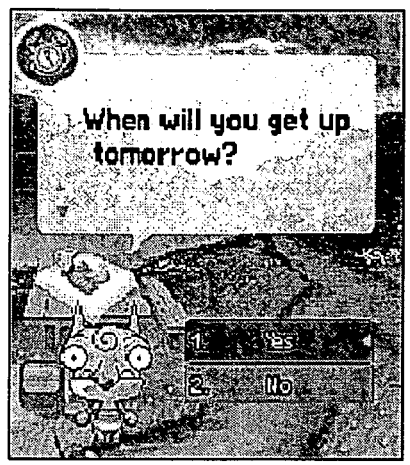
FIGS. 24A-24D illustrate exemplary screens in an operation for processing an alarm event for recommending a morning call change in accordance with an embodiment of the present invention.
Figure 24B:
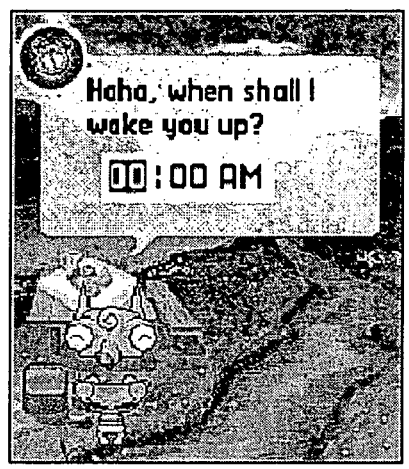
Figure 24C:
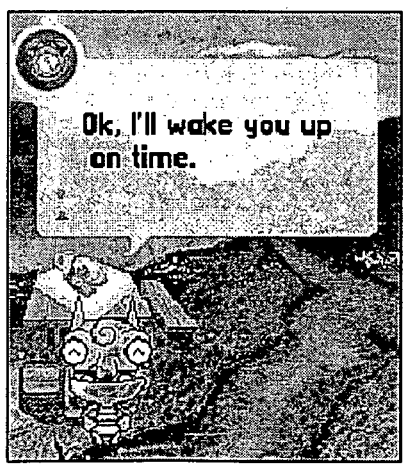
Figure 24D:
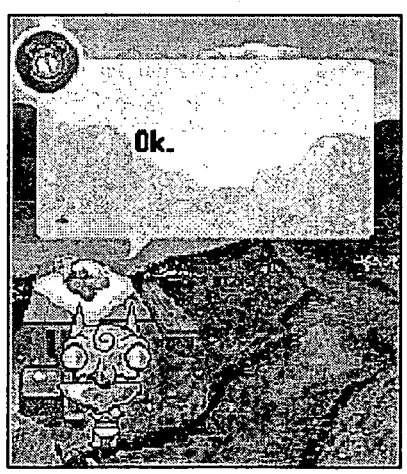

When a called specialist (i.e., the ID30 specialist) makes the return, the specialist manager provides the supervisor with an ID of the specialist returning the 'YES' signal (i.e., Special ID 30) in step 2020. Then, the supervisor identifies priorities of associated specialists or identifies the execution of an associated specialist in step 2022. In step 2024, the supervisor sends, to the specialist manager, a result of the identification for the highest priority specialist or the execution of the associated specialist. Then, the specialist manager identifies a UI ID of the highest priority specialist or the specialist to be executed in step 2026 and sends the identified UI ID to the agent expression part in step 2028. Then, the agent expression part expresses an associated UI. When the agent expression part expresses a UI, text for recommending the morning call change can be expressed as illustrated in FIG. 24(A). According to the user's feedback, a character with a happy expression and/or an image or text for setting a morning call time is expressed as illustrated in FIG. 24(B). When the morning call time is set, a character with a happy expression and/or text for identifying a morning call change is expressed as illustrated in FIG. 24(C). According to the user's feedback, a character with a sad expression and/or text are expressed which indicate that the morning call is not changed as illustrated in FIG. 24(D). When a predetermined time elapses or a predetermined key is input, the expressed character and/or text disappear.

Figure 8:
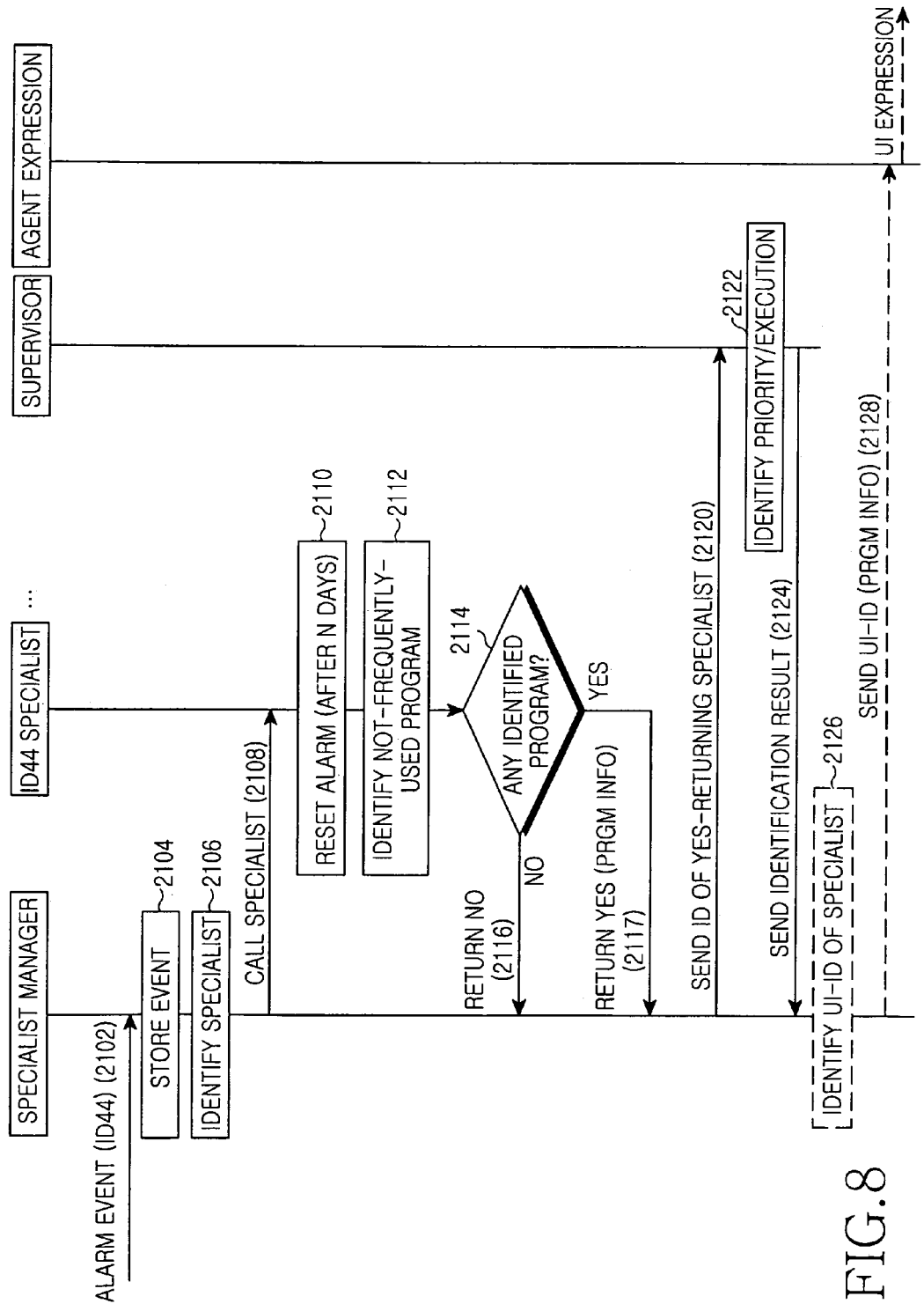
FIG. 8 is a flowchart illustrating an operation for processing an alarm event for recommending an execution of a program that has been recently and infrequently executed using a character agent in accordance with an embodiment of the present invention.

FIG. 8 is a flowchart illustrating an operation for processing an alarm event for recommending an execution of a program that has been recently and infrequently executed using a character agent in accordance with an embodiment of the present invention. Hereinafter, an ID44 alarm event may be set as a default and may occur in every preset period (e.g., one week). When an application program-related event occur, the occurred event is collected and stored and an associated alarm event can be set through specialists called according to each occurred event.

Referring to FIG. 8, the specialist manager stores a received alarm event in the blackboard in step 2104 when the alarm event (e.g., ID 44) is delivered in step 2102. Then, the specialist manager identifies specialists to be called from an internal specialist list when an associated alarm event occurs in step 2106. Then, the specialist manager calls the specialists in step 2108. The called specialist of ID 44 is provided to recommend an execution of an application program that has been recently executed less than a threshold number of times in a predetermined period. For example, the alarm is reset, for example, after N days, in step 2110 (Alarm ID 44). This alarm reset is called and operated in a period of N (one week). For example, when the occurrence time of the alarm event is 2 p.m. on November 10 and the period N is one week, the occurrence time of the next alarm event is 2 p.m. on November 17.

The ID44 specialist identifies application program execution records through the blackboard and determines if an application program is present which has been infrequently executed less than a threshold number of times (e.g., two times) for a predetermined period N (e.g., one recent week), in steps 2112 and 2114. If the associated application program is absent, the ID44 specialist proceeds to step 2116 to return the 'NO' signal to the specialist manager. However, if the associated application program is present, the ID44 specialist proceeds to step 2117 to return the 'YES' signal to the specialist manager. When the 'YES' signal is returned, information of the associated application program can also be returned.

Figure 25A:
FIGS. 25A-25C illustrate exemplary screens in an operation for processing an alarm event for recommending an execution of a program that has been recently and infrequently executed in accordance with an embodiment of the present invention.
Figure 25B:
Figure 25C:

When a called specialist (i.e., the ID44 specialist) makes the return, the specialist manager provides the supervisor with an ID of the specialist returning the 'YES' signal (i.e., Special ID 44) in step 2120. Then, the supervisor identifies priorities of associated specialists or identifies the execution of an associated specialist in step 2122. In step 2124, the supervisor sends, to the specialist manager, a result of the identification for the highest priority specialist or the execution of the associated specialist. Then, the specialist manager identifies a UI ID of the highest priority specialist or the specialist to be executed in step 2126 and sends the identified UI ID to the agent expression part in step 2128. Then, the agent expression part expresses an associated UI. When the UI ID is sent from the specialist manager to the agent expression part, information of the associated application program is also sent. When the agent expression part expresses a UI, the information of the associated application program and text for recommending an execution of the associated application program can be expressed as illustrated in FIG. 25(A). According to the user's feedback, a character with a happy expression and/or text for approving an execution of the associated application program is expressed as illustrated in FIG. 25(B). According to the user's feedback, a character with a sad expression and/or text are expressed which indicate that the associated application program is not executed as illustrated in FIG. 25(C). When a predetermined time elapses or a predetermined key is input, the expressed character and/or text disappear.

Figure 9:
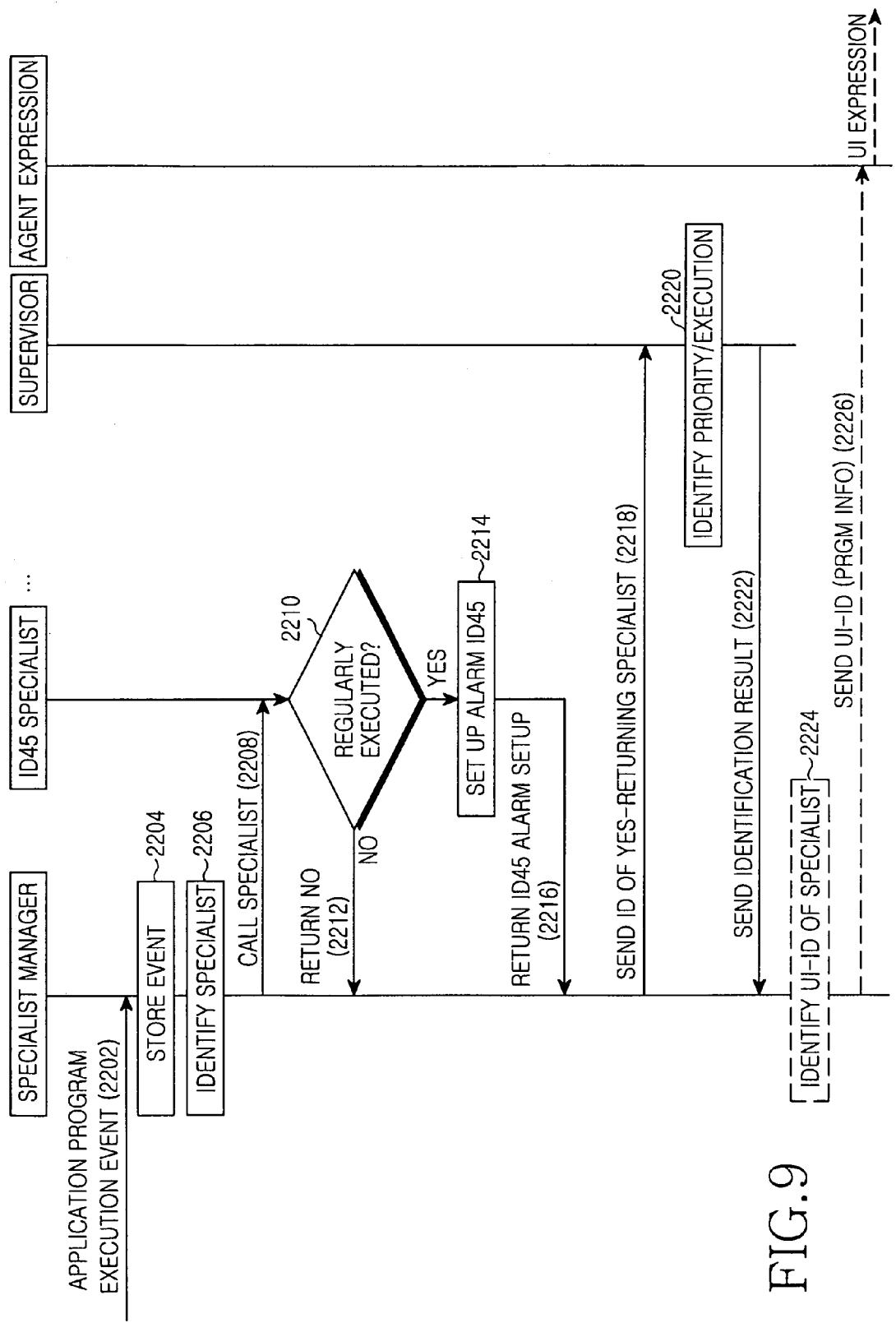
FIG. 9 is a flowchart illustrating an operation for setting up an alarm for recommending an execution of a program that has been previously and regularly executed but that has not been recently executed using a character agent in accordance with an embodiment of the present invention.

FIG. 9 is a flowchart illustrating an operation for setting up an alarm for recommending an execution of a program that has been previously and regularly executed but has not been recently executed using a character agent in accordance with an embodiment of the present invention. An alarm event can be provided to the agent control part through the event collection part and the event delivery part.

Referring to FIG. 9, the specialist manager stores a received application program execution event in the blackboard in step 2204 when the application program execution event is delivered in step 2202. Then, the specialist manager identifies specialists to be called from an internal specialist list at the time of the application program execution event in step 2206, and calls the identified specialists in step 2208. (A specialist of ID 45 is called in FIG. 9.)

The called ID45 specialist is provided to recommend an execution of an associated application program when the application program has been regularly executed at least a predetermined number of times per second predetermined period for a first predetermined period but has not been executed for the next third predetermined period. For example, the ID45 specialist recommends an execution of an associated application program when the application program has been regularly executed at least a threshold number of times (e.g., at least one time) per second predetermined period (e.g., week) for the first predetermined period (e.g., one month) but has not been executed for the next third predetermined period (e.g., three weeks).

In step 2210, the ID45 specialist identifies the blackboard and determines if the associated application program has been executed (at least a threshold number of times per second predetermined period for the first predetermined period). For example, the ID45 specialist determines if the associated application program has been executed at least one time per week for last month.

If the application program has not been executed (at least a threshold number of times (e.g., at least one time) per second predetermined period (e.g., week) for the first predetermined period (e.g., one month) as a determination result, the operation proceeds to step 2212 to return the 'NO' signal to the specialist manager. However, if the application program has been executed (at least a threshold number of times (e.g., at least one time) per second predetermined period (e.g., week) for the first predetermined period (e.g., one month)) as a determination result, the operation proceeds to step 2214. In step 2214, the ID45 alarm is set up. In the ID45 alarm setup, an alarm occurrence time (i.e., a predetermined time after three weeks of the third predetermined period from the ID45 alarm setup time) is set, and an associated application program is registered for the ID45 alarm. If the ID45 alarm has been previously set up, the ID45 alarm time is reset to the next occurrence time. Then, the operation proceeds to step 2216 to return the 'ID45 alarm setup' signal to the specialist manager. For example, the 'ID45 alarm' is set up and the 'ID45 alarm setup' signal is returned to the specialist manager when the user has executed the application program at least one time in the first week, at least one time in the second week, at least one time in the third week, and at least one time in the fourth week. In the ID45 alarm setup, an alarm occurrence time (i.e., a predetermined time after three weeks from the ID45 alarm setup time) is set, and an associated application program is registered for the ID45 alarm.

When a called specialist (i.e., the specialist of ID 45) makes the return, the specialist manager provides the supervisor with an ID of the specialist returning the 'YES' signal in step 2218. In FIG. 9, the number of specialists called at the time of the application program execution event is one corresponding to the specialist of ID 45 in accordance with an embodiment of the present invention. In this case, a specialist ID to be sent from the specialist manager to the supervisor is absent in step 2218 because the associated specialist of ID 45 returns the 'NO' signal and the 'ID45 alarm setup' signal. In an alternative embodiment, the specialist can be configured such that it performs a suitable operation at the time of an associated application program execution event and returns the 'ID45 alarm setup' signal. In this case, the specialist manager can provide the supervisor with an ID of a specialist returning an associated 'ID45 alarm setup' signal in step 2218. Then, the supervisor identifies priorities of associated specialists or identifies the execution of an associated specialist in step 2220. The supervisor sends, to the specialist manager, a result of the identification for the highest priority specialist or the execution of the associated specialist in step 2222. Then, the specialist manager identifies a UI ID of the highest priority specialist or the specialist to be executed and sends the identified UI ID to the agent expression part in step 2224. When the UI ID is sent to the agent expression part, an associated UI (or alarm registration UI) can be expressed in step 2226.

Figure 10:
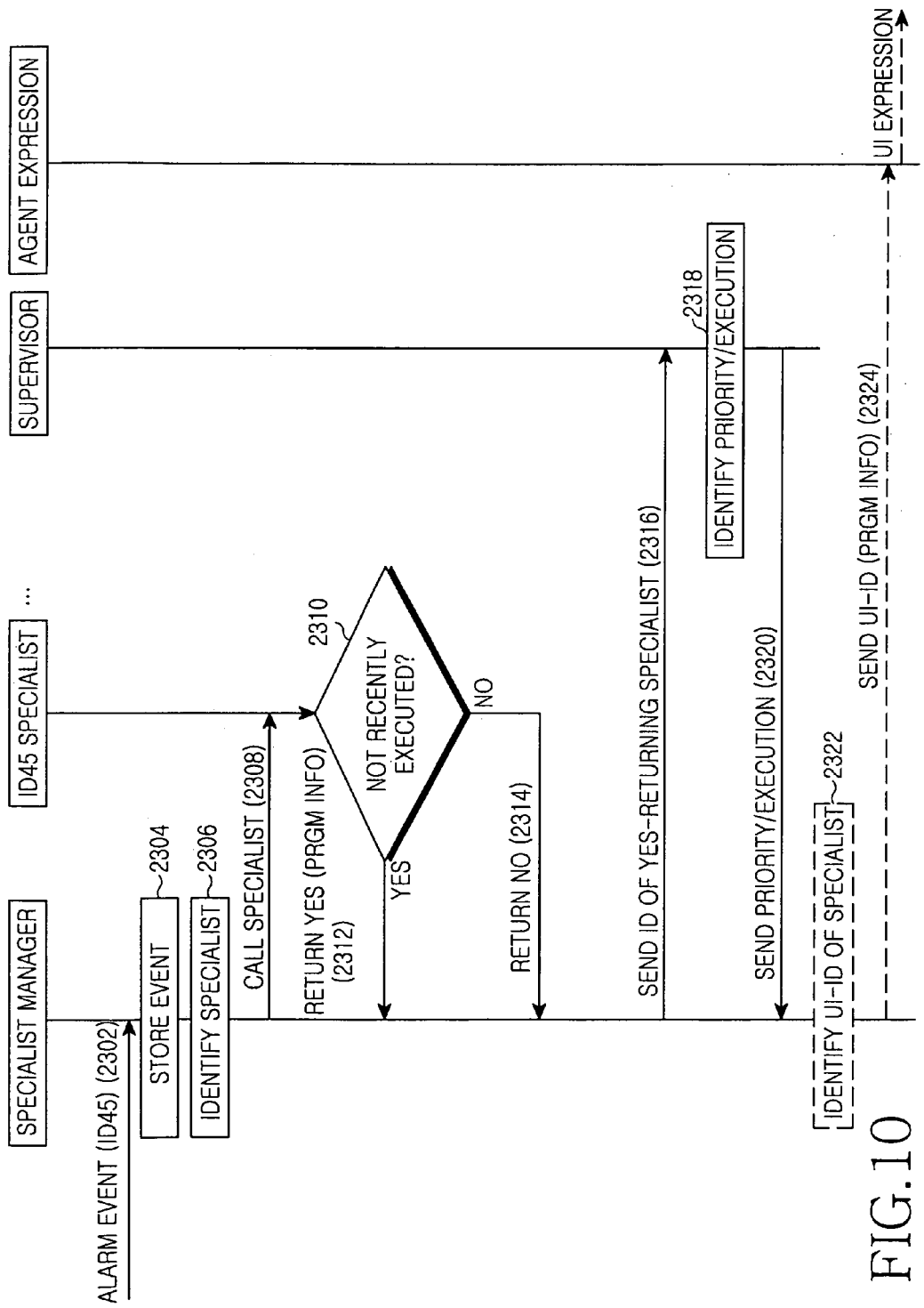
FIG. 10 is a flowchart illustrating an operation for processing an alarm event for recommending an execution of a program that has been previously and regularly executed but that has not been recently executed using a character agent in accordance with an embodiment of the present invention.

FIG. 10 is a flowchart illustrating an operation for processing an alarm event for recommending an execution of a program that has been previously and regularly executed but has not been recently executed using a character agent in accordance with an embodiment of the present invention. Referring to FIG. 10, the specialist manager stores a received application program execution event in the blackboard in step 2304 when the application program execution event is delivered in step 2302. Then, the specialist manager identifies specialists to be called from an internal specialist list at the time of the application program execution event in step 2306, and calls the identified specialists in step 2308. (A specialist of ID 45 is called in FIG. 10.)

The called ID45 specialist is provided to recommend an execution of an associated application program when the application program has been regularly executed at least a predetermined number of times (e.g., at least one time) per second predetermined period (e.g., week) for a first predetermined period (e.g., one month) but has not been executed for the next third predetermined period (e.g., three weeks). In step 2310, the ID45 specialist analyzes application program records through the blackboard and determines if the application program has been regularly executed (at least a threshold number of times per second predetermined period for the first predetermined period) and the associated application program registered for the ID45 alarm event has been recently executed at least a threshold number of times (e.g., at least one time) for three weeks of the third predetermined period from the time of the ID45 alarm event setup. If the associated application program has not been recently executed at least a threshold number of times (e.g., at least one time), the operation proceeds to step 2312 to return the 'YES' signal to the specialist manager. When the 'YES' signal is returned, information of the associated application program can also be returned. For example, if the associated application program has been regularly executed at least one time per week for last month, the ID45 alarm event has been set up, and the application program registered for the ID45 alarm event has not been executed at least one time for three weeks from the time of ID45 alarm event setup, the 'YES' signal is returned to the specialist manager.

If the associated application program has been recently executed at least a threshold number of times (e.g., at least one time) (for the third predetermined period from the setup time of the ID45 alarm event) as a determination result, the operation proceeds to step 2314 to return the 'NO' signal to the specialist manager.

When a called specialist (i.e., the ID45 specialist) makes the return, the specialist manager provides the supervisor with an ID of the specialist returning the 'YES' signal in step 2316. Then, the supervisor identifies priorities of associated specialists or identifies the execution of an associated specialist in step 2318. In step 2320, the supervisor sends, to the specialist manager, a result of the identification for the highest priority specialist or the execution of the associated specialist. Then, the specialist manager identifies a UI ID of the highest priority specialist or the specialist to be executed in step 2322 and sends the identified UI ID to the agent expression part in step 2324. Then, the agent expression part expresses an associated UI. When the UI ID is sent from the specialist manager to the agent expression part, information of the associated application program is also sent. When the agent expression part expresses a UI, the information of the associated application program, text for recommending an execution of the associated application program, and a selection button list can be expressed. According to the user's feedback, a character with a happy expression and/or text for identifying an execution of the associated application program are expressed. According to the user's feedback, a character with a sad expression and/or text are expressed which indicate that the associated application program is not executed. When a predetermined time elapses or a predetermined key is input, the expressed character and/or text disappear.

An operation for processing an application program-related event of a wireless terminal on a specialist-by-specialist basis using a character agent as described above can be performed. The overall operation for processing an application program-related event of the wireless terminal will be described with reference to the accompanying drawings. To implement the present invention, the controller 100 controls a single agent system without functional blocks and controls the memory 23 and the display unit 27. In this case, the memory 23 can collect and store events occurring in the wireless terminal.

Figure 11:
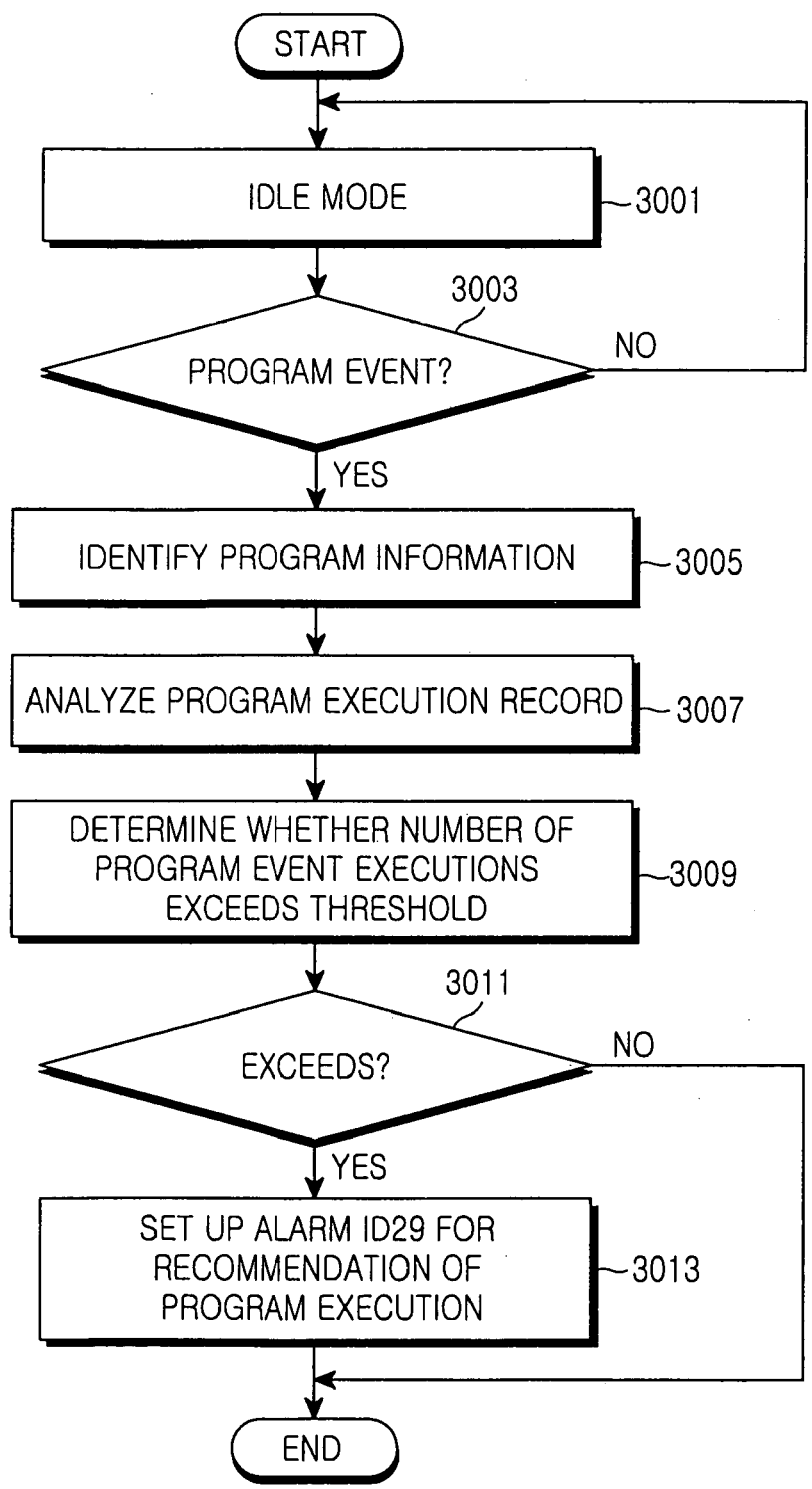
FIG. 11 is a flowchart illustrating an operation for setting up an alarm for recommending a program execution in the wireless terminal in accordance with an embodiment of the present invention.

FIG. 11 is a flowchart illustrating an operation for setting up an alarm for recommending a program execution in the wireless terminal in accordance with an embodiment of the present invention. An operation for setting up an alarm for recommending that an associated application program be executed at a specific time or on a specific day of the week when the associated application program has been frequently executed at the specific time or on the specific day of the week will be described with reference to FIG. 11. When an application program execution event occurs in idle mode in step 3001, the controller 100 detects the occurred event in step 3003 and proceeds to step 3005. In step 3005, the controller 100 identifies application program information of the occurred event. The application program information includes a type, occurrence time, and end time of the application program, and so on.

The controller 100 analyzes execution records of application programs executed up to now in step 3007 and then proceeds to step 3009. The controller 100 determines if the currently executed application program has been frequently executed at the specific time or on the specific day of the week. This determination can be made by determining if the application program has been executed at least a predetermined number of times within the specific time range in every predetermined period. For example, when the user of the wireless terminal has executed the associated application program at 10:10 a.m. on Monday in the first week, at 10:20 a.m. on Monday in the second week, and at 10:15 a.m. on Wednesday in the third week, it can be determined that the associated application program has been executed at least a predetermined number of times within the specific time range in every predetermined period (e.g., 7 days). The specific time range may be a range of from a first predetermined time, which is (30 minutes) earlier than the last end time of the application program, to the program end time, a range of from the program end time to a second predetermined time, which is (30 minutes) later than the program end time, or a range of from the first predetermined time to the second predetermined time.

If the application program has not been executed (at least a threshold number of times) at the specific time or on the specific day of the week as a determination result, the controller 100 proceeds to the step of ending the operation. However, if the application program has been frequently executed at the specific time or on the specific day of the week, the controller 100 proceeds to step 3013. When the application program has not been executed at the specific time or on the specific day of the week, an alarm (ID 29) for recommending the associated application program is set up. In the ID29 alarm setup, an alarm occurrence time (i.e., a predetermined time within a specific time range of the next predetermined period or the last execution time of the associated application program within the specific time range of the next predetermined period) is set and an associated application program is registered for the ID29 alarm.

Figure 12:
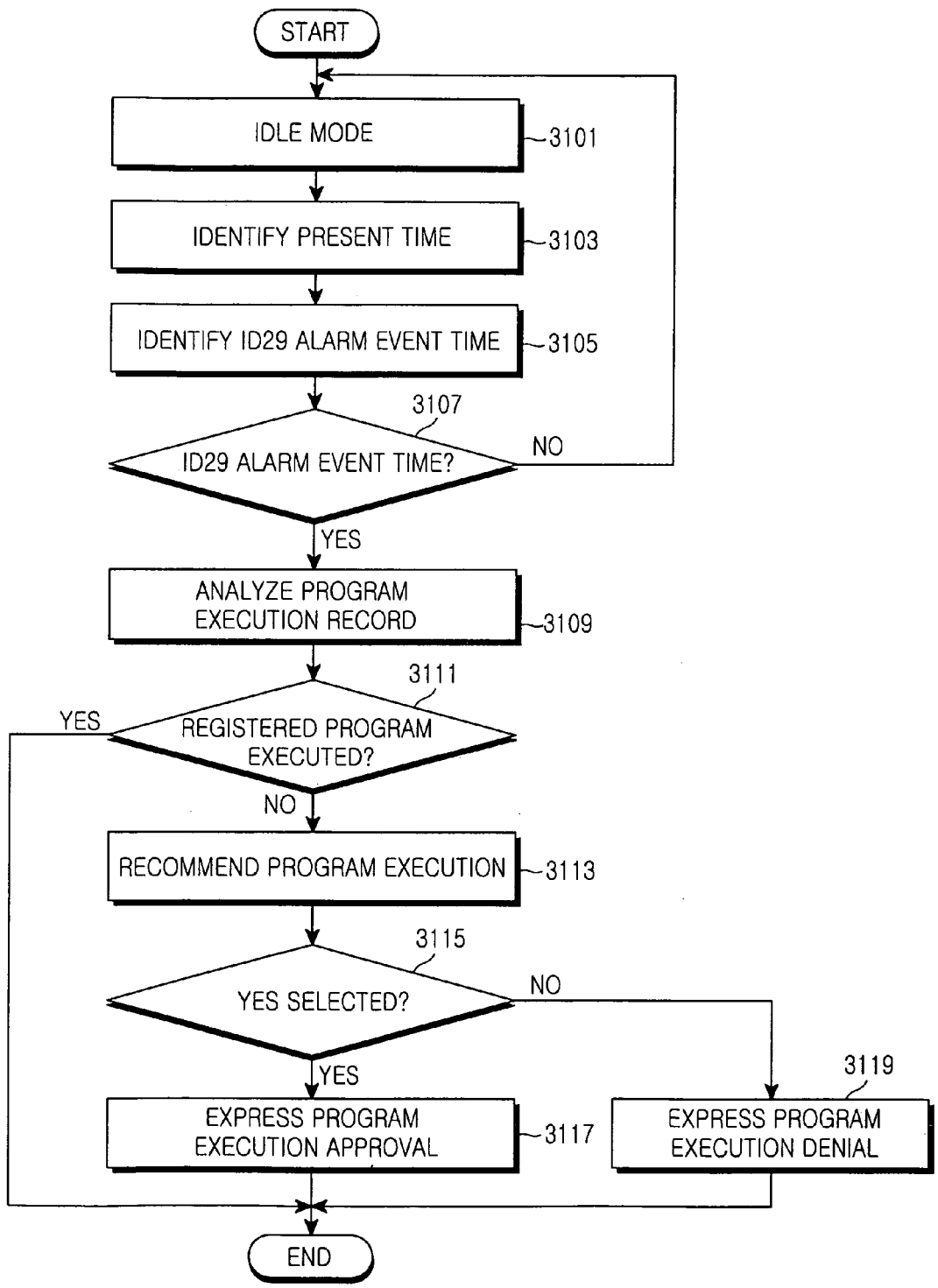
FIG. 12 is a flowchart illustrating an operation for processing an alarm event for recommending an execution of a set program in the wireless terminal in accordance with an embodiment of the present invention.

FIG. 12 is a flowchart illustrating an operation for processing an alarm event for recommending an execution of a set program in the wireless terminal in accordance with an embodiment of the present invention. An operation for processing the alarm event for recommending an execution of an associated application program when the associated application program has not been executed will be described with reference to FIG. 12. The controller 100 enters idle mode in step 3101. The controller 100 proceeds to step 3103 to identify the present time. In step 3105, the controller 100 identifies an occurrence time of a set ID29 alarm event (for recommending an execution of the associated application program when the application program has not been continuously executed at the specific time or on the specific day of the week). If the identified present time corresponds to the occurrence time of the ID29 alarm event, the controller 100 detects it in step 3107 and proceeds to step 3109. In step 3109, the controller 100 analyzes an application program execution record list in which information of application programs executed up to now or during a predetermined period is recorded. Then, the controller 100 proceeds to step 3111 to determine if an associated application program registered for the ID29 alarm event has been executed within the specific time range. If the associated application program registered for the ID29 alarm event has been executed within the specific time range as a determination result, the controller 100 proceeds to the step of ending the operation. However, if the associated application program registered for the ID29 alarm event has not been executed within the specific time range as a determination result, the controller 100 proceeds to step 3113 and expresses a selection button list and a character and text for recommending an execution of the associated application program within the specific time range as illustrated in FIG. 21(A). The specific time range may be a range of from a first predetermined time, which is (30 minutes) earlier than the last execution time of the associated application program, to the program end time, a range of from the program execution time to a second predetermined time, which is (30 minutes) later than the program execution time, or a range of from the first predetermined time to the second predetermined time.

When the user selects 'YES' corresponding to Item No. 1 from the selection button list, the controller 100 detects the selected item in step 3115 and then proceeds to step 3117 to express a feedback for approving an execution of the associated application program. The feedback for approving the execution of the associated application program is expressed by a character with a happy expression and/or text for identifying the approval of the execution of the associated application program as illustrated in FIG. 21(B).

When the user selects 'NO' corresponding to Item No. 2 from the selection button list, the controller 100 detects the selected item in step 3115 and then proceeds to step 3119 to express a feedback for denying an execution of the associated application program. The feedback for denying the execution of the associated application program is expressed by a character with a sad expression and/or text for identifying the denial of the execution of the associated application program as illustrated in FIG. 21(C). When a predetermined time elapses or a predetermined key is input, the expressed character and/or text disappear.

Figure 13:
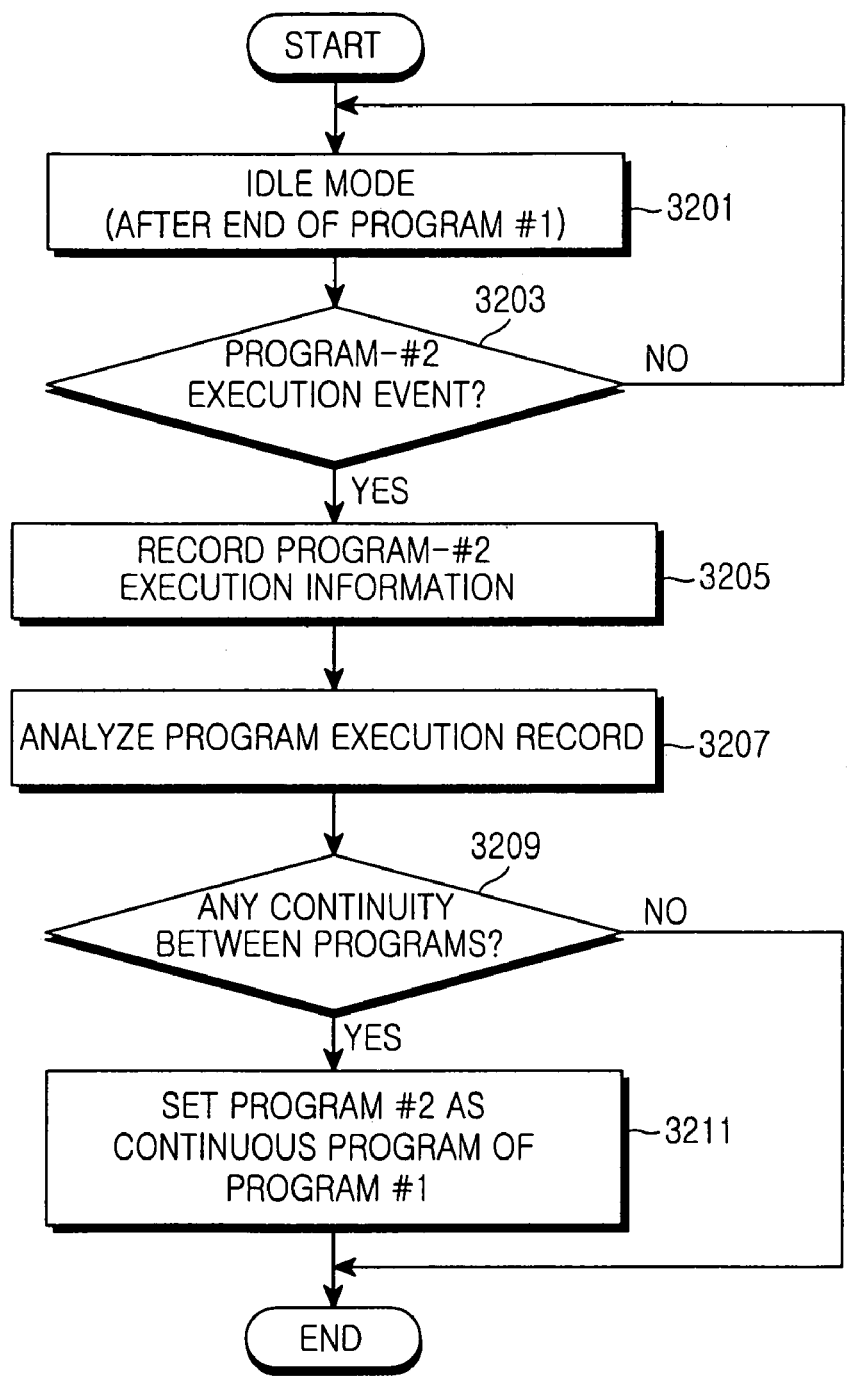
FIG. 13 is a flowchart illustrating an operation for setting a specific program as a continuous execution program after a program is ended in the wireless terminal in accordance with an embodiment of the present invention.

FIG. 13 is a flowchart illustrating an operation for setting a specific program as a continuous execution program after a program is ended in the wireless terminal in accordance with an embodiment of the present invention. In relation to FIG. 13, the operation sets a specific application program (or a second application program) as a continuous execution application program if the specific application program (or the second application program) subsequent to a predetermined program (or a first application program) has been continuously and frequently executed after the predetermined application program (or the first application program) has been ended. When an execution event of the predetermined application program (or the second application program) continuously occurs in response to a user request in idle mode after the previously executed application program (or the first application program) is ended in step 3201, the controller 100 detects the occurred execution event in step 3203 and proceeds to step 3205. In step 3205, the controller 100 analyzes information of the currently executed application program (or the second application program) and records the analyzed information in an application program execution record list in step 3205. Information of application programs executed up to now or during a predetermined period is recorded in the application program execution record list. The application program information may include information of an application program type, an application program execution, the end of an application program, the setup of a continuous execution application program, and so on.

Then, the controller 100 analyzes the application program execution record list in step 3207 and determines if continuity is present between the previously executed application program (or the first application program) and the currently executed application program (or the second application program) in step 3209. That is, the controller 100 determines if the currently executed application program has been continuously executed at least a threshold number of times (e.g., at least three times) after the previously executed application program (or the first application program) has been ended. If the currently executed application program has not been continuously executed at least a threshold number of times after the previously executed application program has been ended, the controller 100 proceeds to the step of ending the operation. However, if the currently executed application program has been continuously executed at least a threshold number of times after the previously executed application program has been ended, the controller 100 proceeds to step 3211. In step 3211, the controller 100 sets (or registers) the currently executed application program (or the second application program) as the continuous execution application program subsequent to the previously executed application program.

Figure 14:
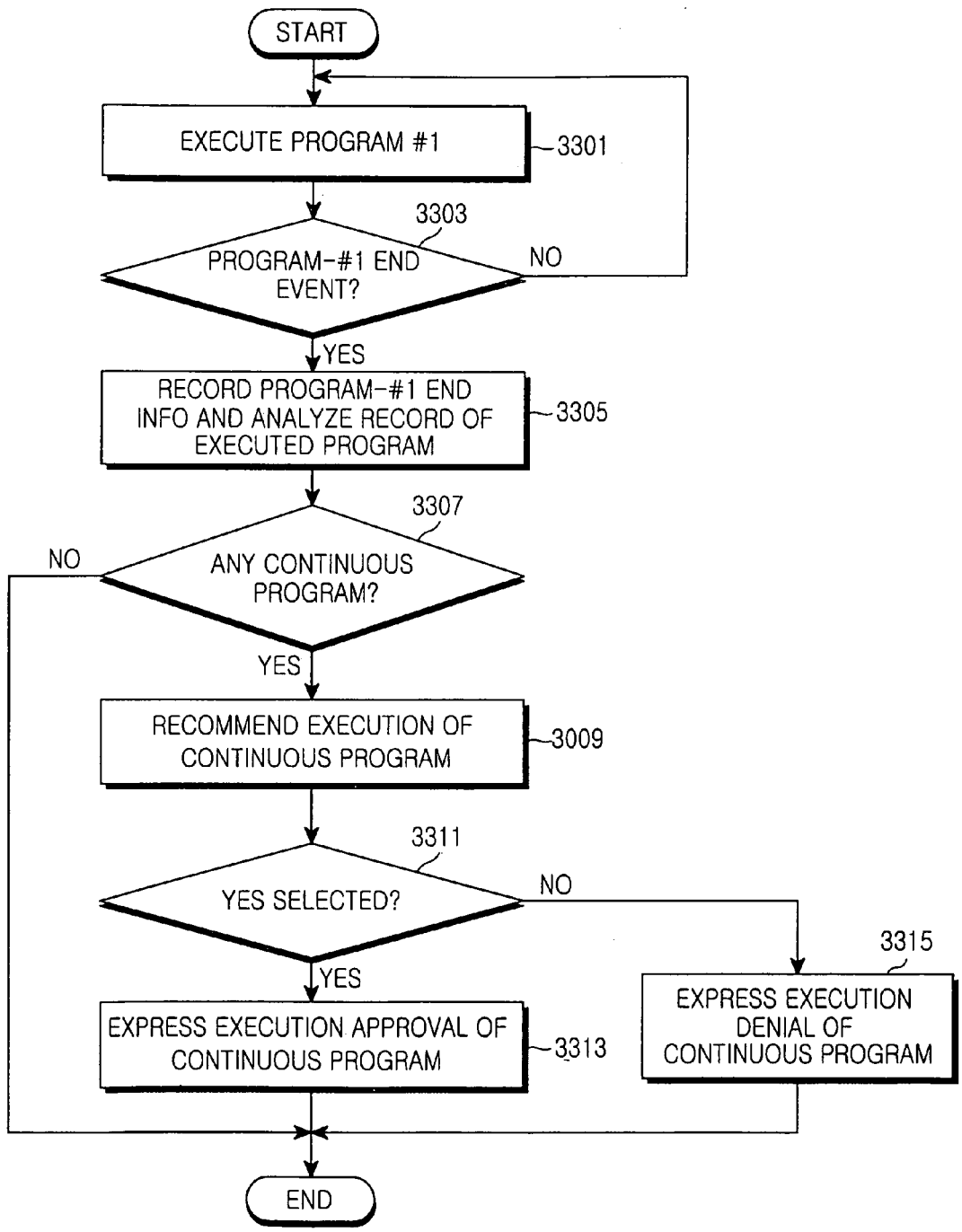
FIG. 14 is a flowchart illustrating an operation for recommending an execution of a specific program after a program is ended in the wireless terminal in accordance with an embodiment of the present invention.

FIG. 14 is a flowchart illustrating an operation for recommending an execution of a specific program after a program is ended in the wireless terminal in accordance with an embodiment of the present invention. An operation for recommending an execution of a specific program when the specific program set as a continuous execution application program has not been executed after a predetermined application program has been ended will be described with reference to FIG. 14. When an event for ending an application program (or a first application program) currently being executed according to the user request occurs in step 3301, the controller 100 detects the end event in step 3303 and proceeds to step 3305. In step 3305, the controller 100 records and identifies information of the ended application program (or the first application program) and analyzes an application program execution record list. Information of application programs executed up to now or during a predetermined period is recorded in the application program execution record list. The application program information may include information of an application program type, an application program execution, the end of an application program, the setup of a continuous execution application program, and so on.

Then, the controller 100 determines if a continuous execution application program is present which is subsequent to the ended application program (or the first application program) in step 3307. If a continuous execution application program is absent which is subsequent to the ended application program (or the first application program) as a determination result, the controller 100 proceeds to the step of ending the operation. However, if a continuous execution application program is present which is subsequent to the ended application program (or the first application program) as a determination result, the controller 100 proceeds to step 3309. In step 3309, the controller 100 expresses a selection button list and a character and text for recommending an execution of a continuous execution application program subsequent to the ended application program (or the first application program) as illustrated in FIG. 22(A).

When the user selects 'YES' corresponding to Item No. 1 from the selection button list, the controller 100 detects the selected item in step 3311 and then proceeds to step 3313 to express a feedback for approving an execution of a continuous execution application program subsequent to the ended application program (or the first application program). The feedback for approving the execution of the continuous execution application program subsequent to the ended application program (or the first application program) is expressed by a character with a happy expression and/or text for identifying the approval of the execution of the continuous execution application program subsequent to the ended application program (or the first application program) as illustrated in FIG. 22(B).

When the user selects 'NO' corresponding to Item No. 2 from the selection button list, the controller 100 detects the selected item in step 3311 and then proceeds to step 3315 to express a feedback for denying an execution of a continuous execution application program subsequent to the ended application program (or the first application program). The feedback for denying the execution of the continuous execution application program subsequent to the ended application program (or the first application program) is expressed by a character with a sad expression and/or text for identifying the denial of the execution of a continuous execution application program subsequent to the ended application program (or the first application program) as illustrated in FIG. 22(C). When a predetermined time elapses or a predetermined key is input, the expressed character and/or text disappear.

Figure 15:
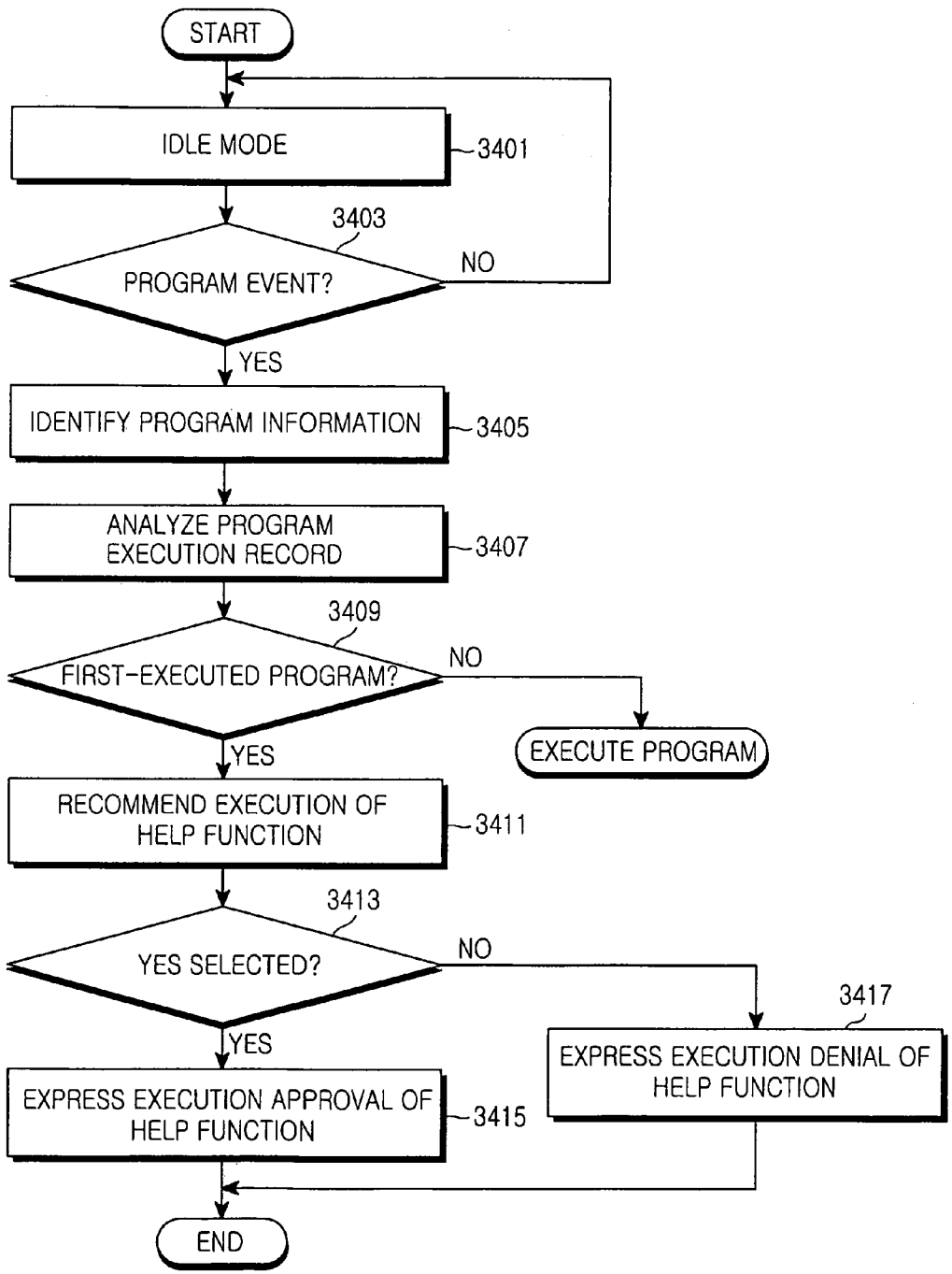
FIG. 15 is a flowchart illustrating an operation for processing an alarm for recommending an execution of a Help function when a program is first used in the wireless terminal in accordance with an embodiment of the present invention.

FIG. 15 is a flowchart illustrating an operation for processing an alarm for recommending an execution of a Help function when a program is first used in the wireless terminal in accordance with an embodiment of the present invention. The operation for processing the alarm event for recommending the execution of the Help function when the application program is first executed will be described with reference to FIG. 15. When a predetermined application program event occurs in idle mode in step 3401, the controller 100 detects the occurred event in step 3403 and then proceeds to step 3405 to identify associated application program information. The application program information may include information of an application program type, an application program execution, the end of an application program, and so on.

In step 3407, the controller 100 analyzes records of application programs executed up to now or during a predetermined period and determines if an associated application program is first executed. If the application program is not first executed as a determination result, the controller 100 immediately executes the application program. However, if the application program is first executed, the controller 100 proceeds to step 3411.

In step 3411, the controller 100 expresses a selection button list and a character and text for recommending the execution of the Help function for describing the application program as illustrated in FIG. 23(A).

When the user selects 'YES' corresponding to Item No. 1 from the selection button list, the controller 100 detects the selected item in step 3413 and then proceeds to step 3415 to express a feedback for approving the execution of the Help function. The feedback for approving the execution of the Help function is expressed by a character with a happy expression and/or text for identifying the approval of the execution of the Help function as illustrated in FIG. 23(B).

When the user selects 'NO' corresponding to Item No. 2 from the selection button list, the controller 100 detects the selected item in step 3413 and then proceeds to step 3417 to express a feedback for denying the execution of the Help function. The feedback for denying the Help function is expressed by a character with a sad expression and/or text for identifying the denial of the execution of the Help function as illustrated in FIG. 23(C). When a predetermined time elapses or a predetermined key is input, the expressed character and/or text disappear.

Figure 16:
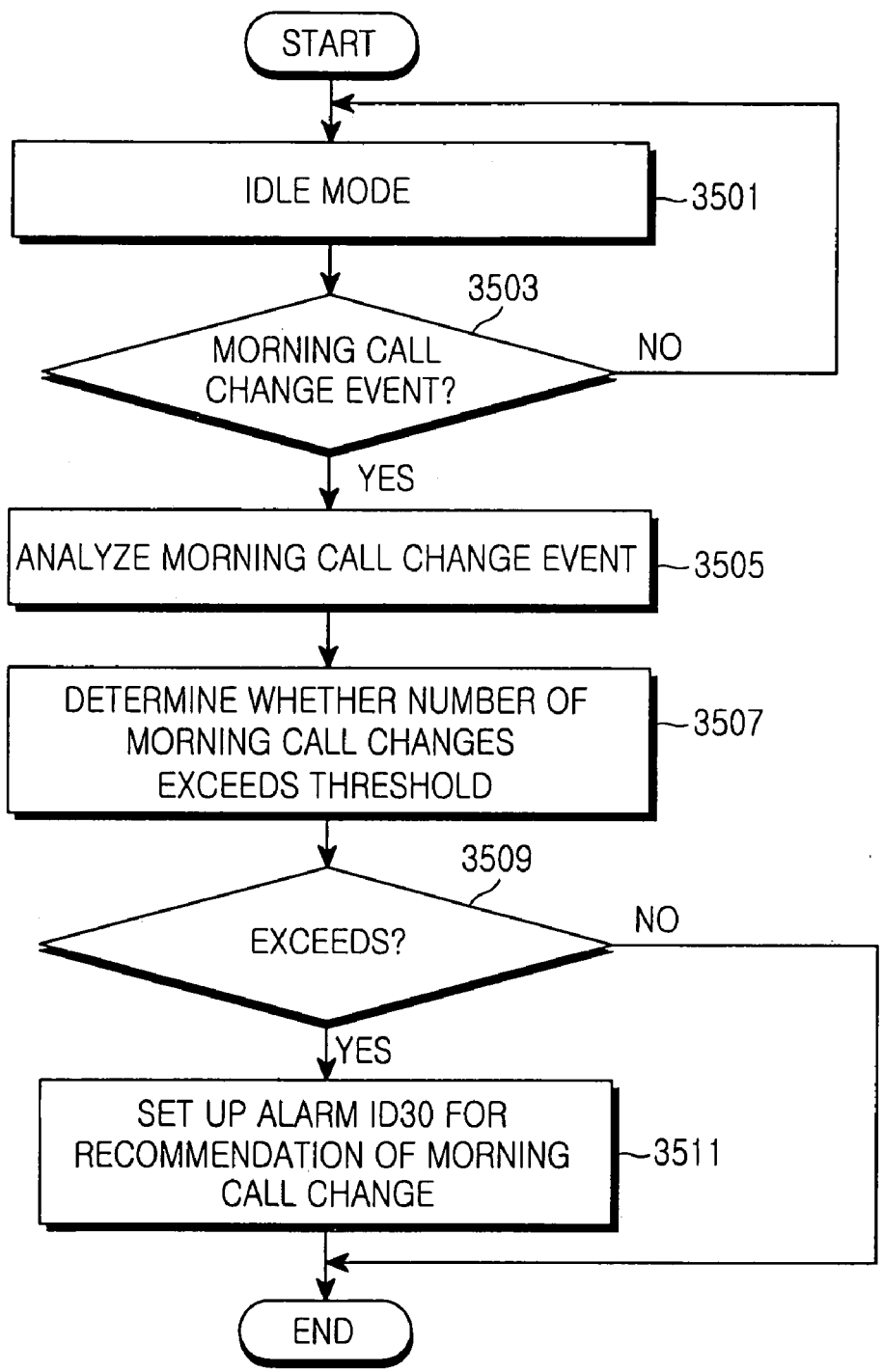
FIG. 16 is a flowchart illustrating an operation for setting up an alarm for recommending a morning call change in the wireless terminal in accordance with an embodiment of the present invention.

FIG. 16 is a flowchart illustrating an operation for setting up an alarm for recommending a morning call change in the wireless terminal in accordance with an embodiment of the present invention. An operation for setting up the alarm for recommending the morning call change at a specific time or on a specific day of the week when the morning call has been previously and frequently changed at the specific time or on the specific day of the week will be described with reference to FIG. 16. When a morning call change event occurs in idle mode in step 3501, the controller 100 detects the occurred event in step 3503 and then proceeds to step 3505. The controller 100 analyzes a morning call change list in which a morning call change event is recorded in step 3505 and then proceeds to step 3507 to determine if the morning call has been frequently changed at the specific time or on the specific day of the week. For example, when the user of the wireless terminal has made the morning call change at 10:10 a.m. on Monday in the first week, at 10:20 a.m. on Monday in the second week, and at 10:15 a.m. on Wednesday in the third week, it can be determined that the morning call has been changed at least a predetermined number of times within a specific time range in every predetermined period (e.g., 7 days). The specific time range may be a range of from a first predetermined time, which is (30 minutes) earlier than the time of the last morning call change, to the morning call change time, a range of from the morning call change time to a second predetermined time, which is (30 minutes) later than the morning call change time, or a range of from the first predetermined time to the second predetermined time.

If the morning call has not been changed (at least a threshold number of times) at the specific time or on the specific day of the week, the controller 100 proceeds to the step of ending the operation. However, if the morning call has been frequently changed, the controller 100 proceeds to step 3511 to set up an alarm (ID 30) for recommending the morning call change at the specific time or on the specific day of the week. In the ID30 alarm setup, an alarm occurrence time (i.e., a predetermined time within the specific time range of the next predetermined period or the last morning call change time within the specific time range of the next predetermined period) can be set.

Figure 17:
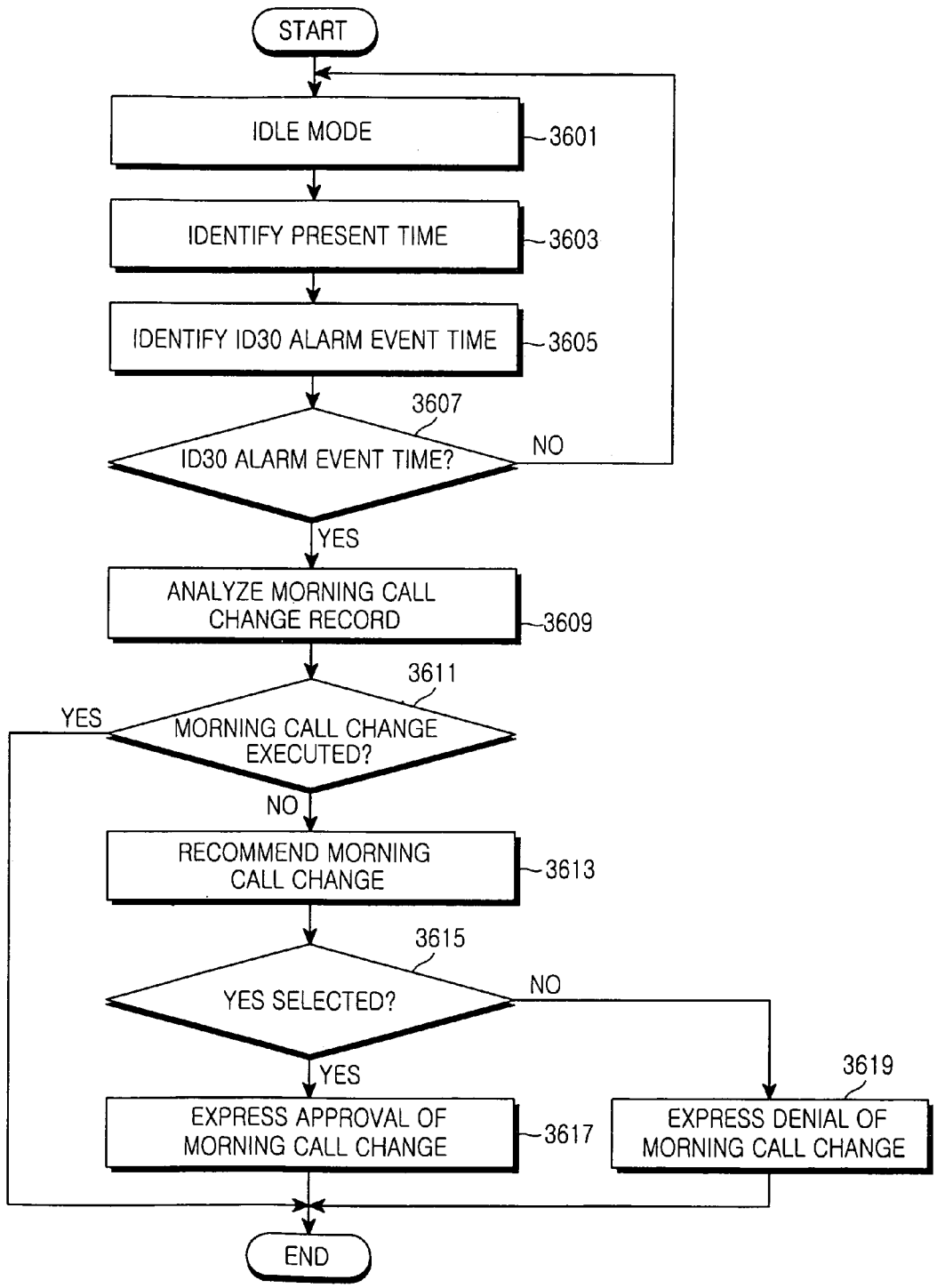
FIG. 17 is a flowchart illustrating an operation for processing an alarm event for recommending a morning call change in the wireless terminal in accordance with an embodiment of the present invention.

FIG. 17 is a flowchart illustrating an operation for processing an alarm event for recommending a morning call change in the wireless terminal in accordance with an embodiment of the present invention. An operation for processing the alarm event for recommending a morning call change when the morning call has not been changed at a specific time or on a specific day of the week will be described with reference to FIG. 17. The controller 100 enters idle mode in step 3601. The controller 100 proceeds to step 3603 to identify the present time. In step 3605, the controller 100 identifies an occurrence time of a set ID30 alarm event (for recommending the morning call change when the morning call has not been continuously changed at the specific time or on the specific day of the week). If the identified present time corresponds to the occurrence time of the ID30 alarm event, the controller 100 detects it in step 3607 and proceeds to step 3609. In step 3609, the controller 100 analyzes a morning call record list in which morning call change information is recorded. In step 3611, the controller 100 determines if the morning call has been changed a predetermined time (e.g., 30 minutes) before the ID30 alarm event occurs. If the morning call has been changed as a determination result, the controller 100 proceeds to the step of ending the operation. However, if the morning call has not been changed, the controller 100 proceeds to step 3613 to express a selection button list and a character and text for recommending the morning call change as illustrated in FIG. 24(A).

When the user selects 'YES' corresponding to Item No. 1 from the selection button list, the controller 100 detects the selected item in step 3615 and then proceeds to step 3617 to express a feedback for approving the morning call change. The feedback for approving the morning call change is expressed by a character with a happy expression and/or text for setting a morning call time as illustrated in FIG. 24(B). When the morning call time is set, the controller 100 expresses a character with a happy expression and/or text for identifying the morning call change as illustrated in FIG. 24(C).

When the user selects 'NO' corresponding to Item No. 2 from the selection button list, the controller 100 detects the selected item in step 3615 and then proceeds to step 3619 to express a feedback for denying the morning call change. The feedback for denying the morning call change is expressed by a character with a sad expression and/or text associated with the denial of the morning call change as illustrated in FIG. 24(D). When a predetermined time elapses or a predetermined key is input, the expressed character and/or text disappear.

Figure 18:
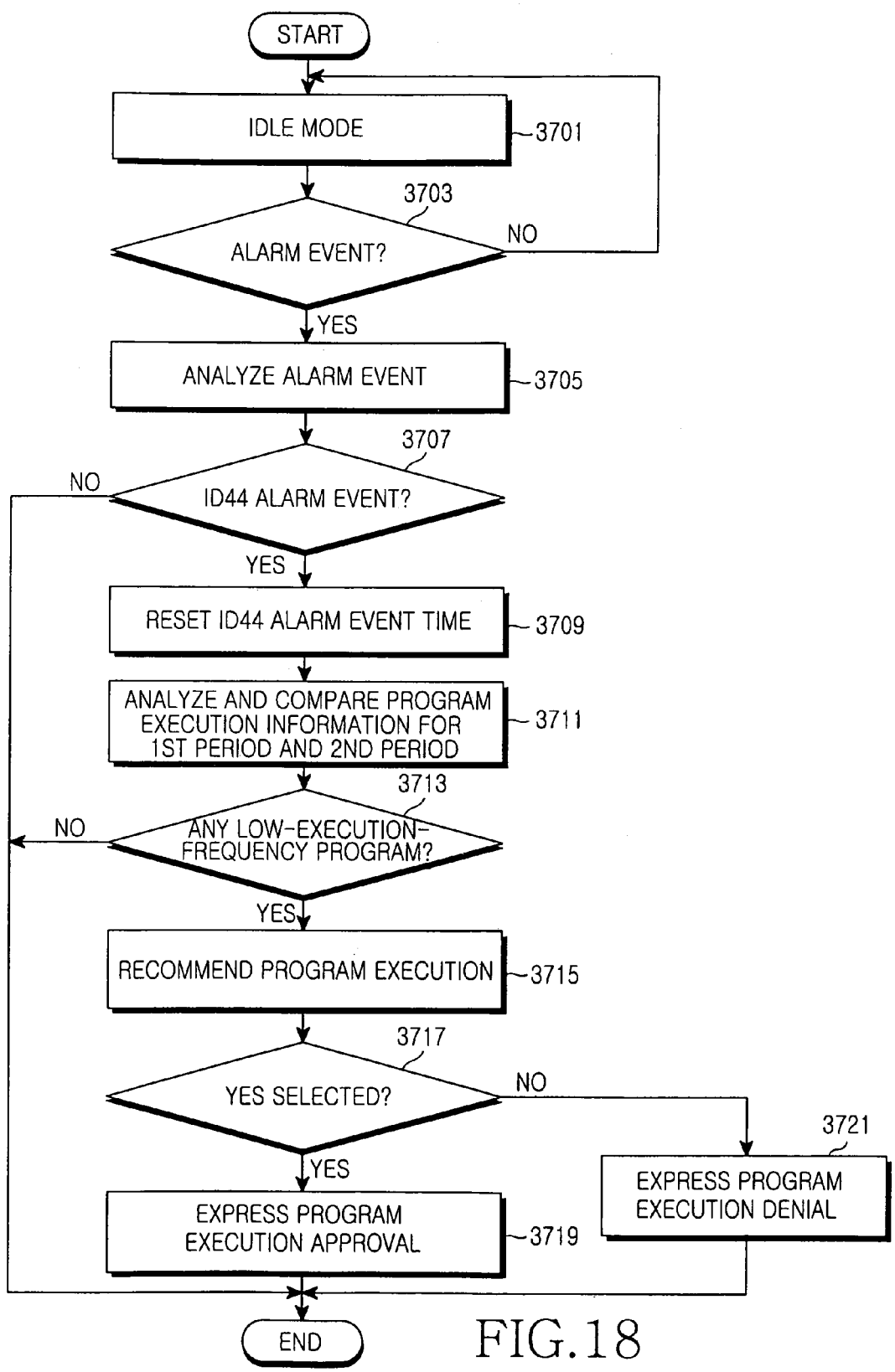
FIG. 18 is a flowchart illustrating an operation for processing an alarm event for recommending an execution of a program that has been recently and infrequently executed in the wireless terminal in accordance with an embodiment of the present invention.

FIG. 18 is a flowchart illustrating an operation for processing an alarm event for recommending an execution of a program that has been recently and infrequently executed in the wireless terminal in accordance with an embodiment of the present invention. The operation for processing the alarm event for recommending an execution of a program that has been recently and infrequently executed will be described with reference to FIG. 18. When the alarm event occurs in idle mode in step 3701, the controller 100 detects the occurred alarm event in step 3703 and then proceeds to step 3705. In step 3705, the controller 100 analyzes the occurred alarm event and determines a type of the occurred alarm event. If the occurred alarm event is an ID44 alarm event (for recommending an application program executed recently and infrequently) as a determination result, the controller 100 detects the occurred alarm event in step 3707 and then proceeds to step 3709. In step 3709, the controller 100 resets an occurrence time of the ID44 alarm event. The alarm reset is called and operated in a period of N (one week). For example, when the occurrence time of the alarm event is 2 p.m. on November 10 and the period N is one week, the occurrence time of the next alarm event may be 2 p.m. on November 17.

In step 3711, the controller 100 analyzes an application program execution list and compares the number of executions of each application program executed for a first predetermined period (e.g., last week) with the number of executions of each application program executed for a second predetermined period (e.g., this week). The controller 100 proceeds to step 3713 to determine if an application program is present which has been infrequently executed less than a predetermined number of times. If the infrequently executed application program is absent as a determination result, the controller 100 proceeds to the step of ending the operation. However, if the infrequently executed application program is present, the controller 100 proceeds to step 3715. In step 3715, the controller 100 extracts information of the infrequently executed application program, and expresses a selection button list and a character and text for recommending an execution of an associated application program as illustrated in FIG. 25(A).

When the user selects 'YES' corresponding to Item No. 1 from the selection button list, the controller 100 detects the selected item in step 3717 and then proceeds to step 3719 to express a feedback for approving an execution of the associated application program. The feedback for approving the execution of the associated application program is expressed by a character with a happy expression and/or text for identifying the approval of the execution of the associated application program as illustrated in FIG. 25(B).

When the user selects 'NO' corresponding to Item No. 2 from the selection button list, the controller 100 proceeds to step 3721 to express a feedback for denying an execution of the associated application program. The feedback for denying the execution of the associated application program is expressed by a character with a sad expression and/or text for identifying the denial of the execution of the associated application program as illustrated in FIG. 25(C). When a predetermined time elapses or a predetermined key is input, the expressed character and/or text disappear.

Figure 19:
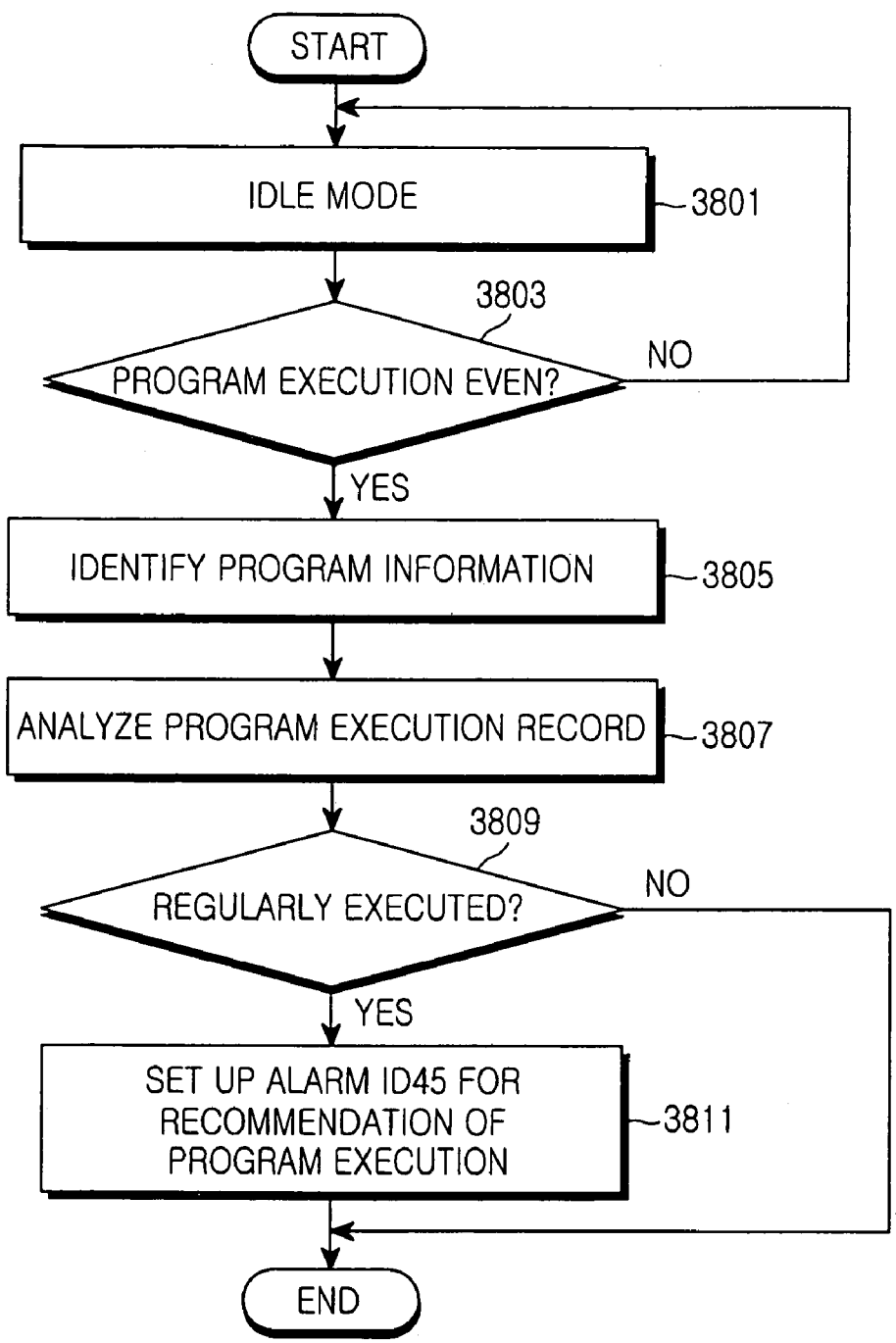
FIG. 19 is a flowchart illustrating an operation for setting up an alarm for recommending an execution of a program that has been previously and regularly executed but has not been recently executed in the wireless terminal in accordance with an embodiment of the present invention.

FIG. 19 is a flowchart illustrating an operation for setting up an alarm for recommending an execution of a program that has been previously and regularly executed but has not been recently executed in the wireless terminal in accordance with an embodiment of the present invention. The operation for setting up the alarm for recommending the execution of the specific application program when the specific application program has been previously and regularly executed but has not been recently executed will be described with reference to FIG. 19. When an application program execution event occurs in idle mode in step 3801, the controller 100 detects the occurred event in step 3803 and then proceeds to step 3805. In step 3805, the controller 100 identifies application program information associated with the occurred event. The application program information includes a type and occurrence time of the application program.

The controller 100 analyzes application program execution records in step 3807 and then proceeds to step 3809 to determine if the current application program has been regularly executed for a predetermined period. This determination can be made by determining if the associated application program has been regularly executed at least a threshold number of times (e.g., at least one time) per second predetermined period (e.g., week) for a first predetermined period (e.g., one month).

If the associated application program has not been regularly executed at least a threshold number of times (e.g., at least one time) per second predetermined period (e.g., week) for the first predetermined period (e.g., one month), the controller 100 proceeds to the step of ending the operation. However, if the associated application program has been regularly executed at least a threshold number of times (e.g., at least one time) per second predetermined period (e.g., week) for the first predetermined period (e.g., one month), the controller 100 proceeds to step 3811. In step 3811, an alarm (ID 45) for recommending an execution of the application program is set up when the specific application program has been previously and regularly executed but has not been recently executed (for a third predetermined period (e.g., three weeks) of from a setup time of the ID45 alarm event to an occurrence time of the ID45 alarm event). In the ID45 alarm setup, an alarm occurrence time (i.e., a predetermined time after threes weeks of the third predetermined period from the ID45 alarm setup time) is set, and an associated application program is registered for the ID45 alarm. However, if the ID45 alarm has been previously set up, the ID45 alarm time is reset to the next occurrence time. The predetermined time after three weeks of the third predetermined period may be a range of from a first predetermined time, which is (30 minutes) earlier than the last execution time of the associated application program, to the program execution time, a range of from the program execution time to a second predetermined time, which is (30 minutes) later than the program execution time, or a range of from the first predetermined time to the second predetermined time.

Figure 20:
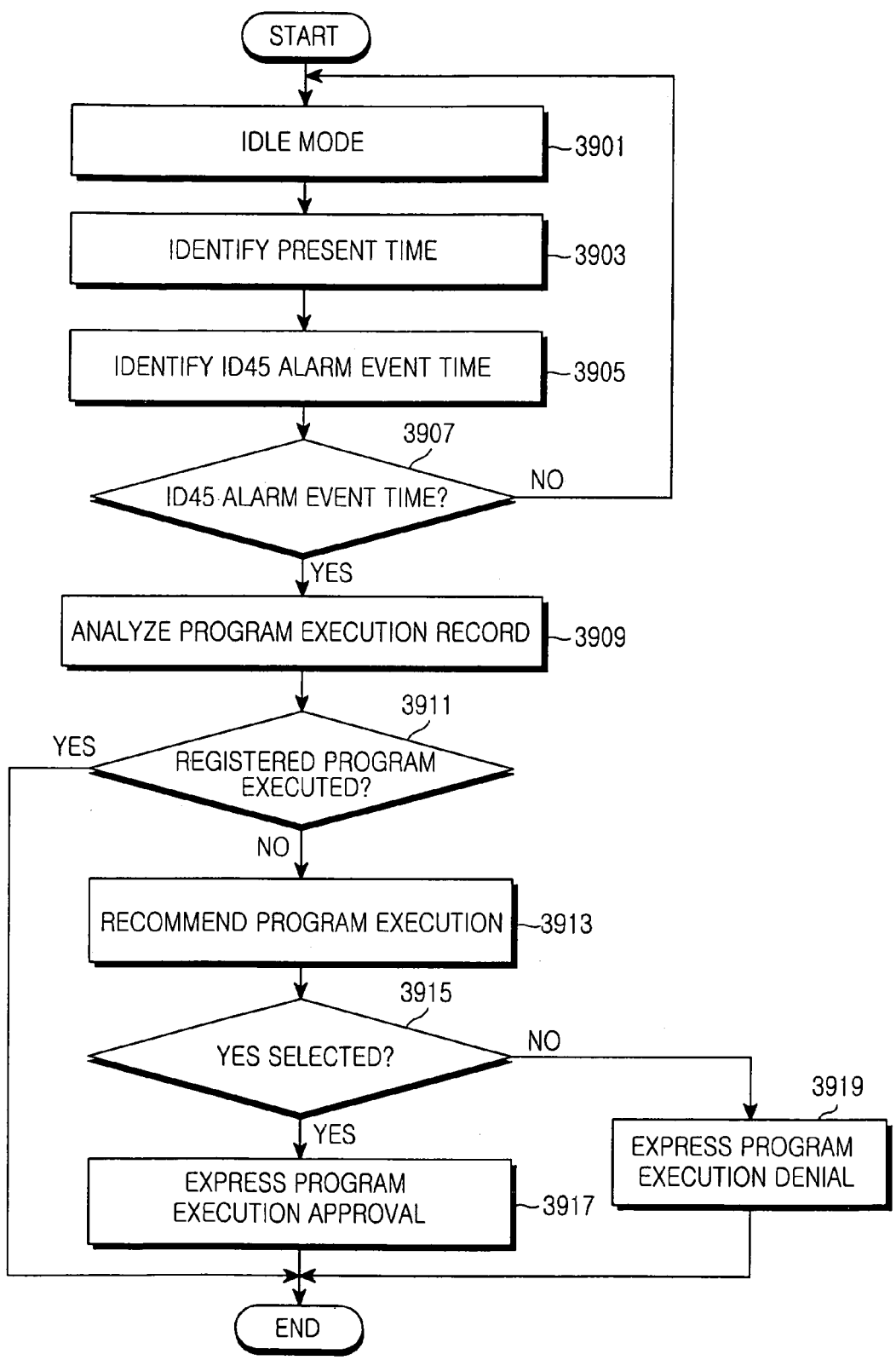
FIG. 20 is a flowchart illustrating an operation for processing an alarm event for recommending an execution of a program that has been previously and regularly executed but has not been recently executed in the wireless terminal in accordance with an embodiment of the present invention.

FIG. 20 is a flowchart illustrating an operation for processing an alarm event for recommending an execution of a program that has been previously and regularly executed but has not been recently executed in the wireless terminal in accordance with an embodiment of the present invention. The operation for processing an alarm event for recommending an execution of a program that has been previously and regularly executed but has not been recently executed will be described with reference to FIG. 20. The controller 100 enters idle mode in step 3901. The controller 100 proceeds to step 3903 to identify the present time. In step 3905, the controller 100 identifies an occurrence time of a set ID45 alarm event (for recommending an execution of a program that has been previously and regularly executed but has not been recently executed). If the identified present time corresponds to the occurrence time of the ID45 alarm event, the controller 100 detects it in step 3907 and proceeds to step 3909. In step 3909, the controller 100 analyzes an application program execution record list in which application program execution information is recorded. In step 3911, the controller 100 determines if an associated application program has been executed in a predetermined time (e.g., a third predetermined period (e.g., three weeks) of from the ID45 alarm setup time to the occurrence time of the ID45 alarm setup time) before the occurrence time of the ID45 alarm event.

If the associated application program has been executed as a determination result, the controller 100 proceeds to the step of ending the operation. However, if the associated application program has not been executed as a determination result, the controller 100 proceeds to step 3913 to express a selection button list and a character and text for recommending an execution of the associated application program. When the user selects 'YES' from the selection button list, the controller 100 detects the selected item in step 3915 and then proceeds to step 3917 to express a feedback for approving an execution of the associated application program. The feedback for approving the execution of the associated application program is expressed by a character with a happy expression and/or text for identifying the approval of the execution of the associated application program. When the user selects 'NO' from the selection button list, the controller 100 detects the selected item in step 3915 and proceeds to step 3919 to express a feedback for denying an execution of the associated application program. The feedback for denying the execution of the associated application program is expressed by a character with a sad expression and/or text for identifying the denial of the execution of the associated application program. When a predetermined time elapses or a predetermined key is input, the expressed character and/or text disappear.

In accordance with the exemplary embodiments of the present invention as described above, a character agent function is added to a wireless terminal and an avatar user interface (UI) for generating and processing an event is expressed when an event occurs in the wireless terminal, such that an application program-related event occurring in the wireless terminal can be expressed through the character agent function.

In accordance with the exemplary embodiments of the present invention as described above, an operation for processing an application program-related event can be performed in the wireless terminal. Although a number of exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An apparatus for processing an application program-related event in a wireless terminal, the apparatus comprising:
    a memory for storing character user interface (UI) images associated with application program-related events;
    an event collection part for collecting the application program-related events occurring in the wireless terminal, and generating an event message for identifying its associated application program-related event;
    an agent control part, comprising a plurality of specialists for processing the application program-related events, for selecting a specialist mapped to the event message from the plurality of specialists, setting an alarm event for an application program-related event of the selected specialist, and upon arrival of an occurrence time of the alarm event, selecting and outputting a character UI for information on the alarm event and processing user feedback information for an associated event in response to the feedback information received from a user; and
    an agent expression part for outputting a character and text mapped to the application program-related event and the feedback information.

2. The apparatus of claim 1, further comprising:
    an event delivery part for delivering the application program-related events collected by the event collection part to the agent control part.

3. The apparatus of claim 1, further comprising:
    a supervisor for, when two specialists are selected for one event, selecting a specialist which is most closely related to the event.

4. The apparatus of claim 1, wherein the agent control part comprises a specialist for, after executing a corresponding application program a predetermined number of times or more for a predetermined time range in every time period, recommending execution of the corresponding application program if the corresponding application program is not executed for the predetermined time range in a next time period.

5. The apparatus of claim 4, wherein the predetermined time range comprises a time range spanning from a first time preceding a time at which the corresponding application program is ended, until the time at which the corresponding application program is ended.

6. The apparatus of claim 5, wherein the predetermined time range comprises a time range spanning from the time at which the corresponding application program is ended, until a second time following the time at which the corresponding application program is ended.

7. The apparatus of claim 6, wherein the predetermined time range comprises a time range spanning from the first time to the second time.

8. The apparatus of claim 4, wherein the agent control part is configured to perform a control operation of transmitting a character UI identifier (ID) for an application program-related event of the specialist and information on the corresponding application program to the agent expression part to output a character and text for recommending execution of the corresponding application program.

9. The apparatus of claim 8, wherein the agent control part is configured to perform a control operation of outputting a selection button list along with a character and text for recommending execution of the corresponding application program, and outputting a character and text mapped to feedback information generated by the selection of the selection button.

10. The apparatus of claim 1, wherein the agent control part comprises a specialist for, if the number of continuous executions made for a particular application program after end of a predetermined application program is greater than or equal to a threshold number, designating the particular application program as a continuous-execution application program, and recommending continuous execution of the particular application program after end of the predetermined application program.

11. The apparatus of claim 10, wherein the agent control part is configured to perform a control operation of transmitting a character UI ID for an application program-related event of the specialist and information on the particular application program to the agent expression part to output a character and text for recommending execution of the particular application program.

12. The apparatus of claim 11, wherein the agent control part is configured to perform a control operation of outputting a selection button list along with a character and text for recommending execution of the particular application program, and outputting a character and text mapped to feedback information generated by selection of the selection button.

13. The apparatus of claim 1, wherein the agent control part comprises a specialist for recommending execution of a help function for a first-executed application program.

14. The apparatus of claim 11, wherein the agent control part is configured to perform a control operation of transmitting a character UI ID for an application program-related event of the specialist and information on the corresponding application program to the agent expression part to output a character and text for recommending execution of a help function provided for a description of the corresponding application program.

15. The apparatus of claim 14, wherein the agent control part is configured to perform a control operation of outputting a selection button list along with a character and text for recommending execution of the help function provided for a description of the corresponding application program, and outputting a character and text mapped to feedback information generated by selection of the selection button.

16. The apparatus of claim 1, wherein the agent control part comprises a specialist for, after changing a morning call a predetermined number of times or more for a predetermined time range in every time period, recommending a change in the morning call if the morning call is not changed for the predetermined time range in a next time period.

17. The apparatus of claim 16, wherein the predetermined time range comprises a time range spanning from a first time preceding a time at which the corresponding application program is ended, until the time at which the corresponding application program is ended.

18. The apparatus of claim 17, wherein the predetermined time range comprises a time range spanning from the time at which the corresponding application program is ended, until a second time following the time at which the corresponding application program is ended.

19. The apparatus of claim 18, wherein the predetermined time range comprises a time range spanning from the first time to the second time.

20. The apparatus of claim 16, wherein the agent control part is configured to perform a control operation of transmitting a character UI for a morning call change-related event of the specialist to the agent expression part to output a character and text for recommending a change in the morning call.

21. The apparatus of claim 16, wherein the agent control part is configured to perform a control operation of outputting a selection button list along with a character and text for recommending a change in the morning call, and outputting a character and text mapped to feedback information generated by selection of the selection button.

22. The apparatus of claim 1, wherein the agent control part comprises a specialist for recommending execution of an application program if the number of executions made for the application program for a predetermined time period is less than a threshold number.

23. The apparatus of claim 22, wherein the agent control part is configured to perform a control operation of transmitting a character UJ ID for an application program-related event of the specialist and information on the corresponding application program to the agent expression part to output a character and text for recommending execution of the corresponding application program.

24. The apparatus of claim 22, wherein the agent control part is configured to perform a control operation of outputting a selection button list along with a character and text for recommending execution of the corresponding application program, and outputting a character and text mapped to feedback information generated by selection of the selection button.

25. The apparatus of claim 1, wherein the agent control part comprises a specialist for recommending execution of a corresponding application program if the corresponding application program is not executed for a third time period after the corresponding application program is executed a predetermined number of times or more for a second time period in a first time period.

26. The apparatus of claim 25, wherein the second time period is included in the first time period.

27. The apparatus of claim 25, wherein the third time period is shorter than the first time period.

28. The apparatus of claim 25, wherein the agent control part is configured to perform a control operation of transmitting a character UI ID for an application program-related event of the specialist and information on the corresponding application program to the agent expression part to output a character and text for recommending execution of the corresponding application program.

29. The apparatus of claim 25, wherein the agent control part is configured to perform a control operation of outputting a selection button list along with a character and text for recommending execution of the corresponding application program, and outputting a character and text mapped to feedback information generated by selection of the selection button.

30. A method for processing an application program-related event in a wireless terminal, the method comprising the steps of:
upon occurrence of an application program execution event, collected by a controller, identifying, by the controller, information on the corresponding application program;
determining, by the controller, whether the corresponding application program has been executed a predetermined number of times or more for a predetermined time range in every time period; and
if the corresponding application program has been executed a predetermined number of times or more for a predetermined time range in every time period, setting, by the controller, an alarm event for recommending execution of the corresponding application program if the corresponding application program is not executed for a predetermined time range in a next time period.

31. The method of claim 30, wherein the predetermined time range comprises one of a time range spanning from a first time preceding a time at which the corresponding application program is ended, until the time at which the corresponding application program is ended, a time range spanning from the time at which the corresponding application program is ended, until a second time following the time at which the corresponding application program is ended, and a time range spanning from the first time to the second time.

32. A method for processing an application program-related event in a wireless terminal, the method comprising the steps of:
upon occurrence of an alarm event collected by a controller, determining, by the controller, a type of the alarm event if the alarm event is an alarm event for recommending execution of a corresponding application program when the corresponding application program is not executed for a predetermined time range in a next time period after it has been executed a predetermined number of times or more for the predetermined time range in every time period; analyzing, by the controller, a record of the executed corresponding application program to determine whether the corresponding application program has been executed for the predetermined time range; and
if the corresponding application program is not executed for the predetermined time range, expressing, by the controller, a character and text for recommending execution of the corresponding application program.

33. The method of claim 32, further comprising the steps of:
expressing a selection button list along with a character and text for recommending execution of the corresponding application program; and
if a predetermined selection button is selected from the selection button list, expressing feedback information mapped to the selected selection button.

34. The method of claim 33, wherein the feedback information expression step comprises the steps of:
if a button for approving execution of the corresponding application program is selected from the selection button list, expressing a happy-expression character and text indicating execution approval for the corresponding application program; and
if a button for denying execution of the corresponding application program is selected from the selection button list, expressing a sad-expression character and text indicating execution denial for the corresponding application program.

35. The method of claim 33, wherein the expressed character and text disappear after a lapse of a predetermined time or if a predetermined key is input.

36. The method of claim 34, wherein the expressed character and text disappear after a lapse of a predetermined time or if a predetermined key is input.

37. A method for processing an application program-related event in a wireless terminal, the method comprising the steps of:
if a predetermined application program is continuously executed after end of a previous application program, analyzing, by the controller, information on the predetermined application program and recording, by the controller, the analyzed information in an application program execution record list;

analyzing, by the controller, the application program execution record list, and determining, by the controller, whether the number of continuous executions made for the predetermined application program after end of the previous application program is greater than or equal to a threshold number; and if the number of continuous executions is greater than or equal to the threshold number, designating, by the controller, the predetermined application program as a continuous-execution application program succeeding the previous application program.

38. The method of claim 37, wherein the application program information comprises a type of the application program, application program execution information, application program-end information, and continuous-execution application program setting information.

39. The method of claim 37, wherein the application program execution record list comprises information on an application program executed up to the present or for a predetermined time period, recorded therein.

40. A method for processing an application program-related event in a wireless terminal, the method comprising the steps of:
upon occurrence of an application program end event for an application program in execution, collected by the controller, recording, by the controller, information on the execution-ended application program in an application program execution record list;
analyzing, by the controller, the application program execution record list to determine whether there is any continuous-execution application program succeeding the execution-ended application program; and
if there is a continuous-execution application program succeeding the execution-ended application program, expressing, by the controller, a character and text for recommending execution of the continuous-execution application program.

41. The method of claim 40, further comprising the steps of:
expressing a selection button list along with a character and text for recommending execution of the continuous-execution application program; and
if a predetermined selection button is selected from the selection button list, expressing feedback information mapped to the selected selection button.

42. The method of claim 41, wherein the feedback information expression step comprises the steps of:
if a button for approving execution of the continuous-execution application program is selected from the selection button list, expressing a happy-expression character and text indicating execution approval for the continuous-execution application program; and
if a button for denying execution of the continuous-execution application program is selected from the selection button list, expressing a sad-expression character and text indicating execution denial for the continuous-execution application program.

43. The method of claim 42, wherein the expressed character and text disappear after a lapse of a predetermined time, or if a predetermined key is input.

44. A method for processing an application program-related event in a wireless terminal, the method comprising the steps of:
upon occurrence of an application program execution event, collected by the controller, identifying, by the controller, information on the corresponding application program;

determining, by the controller, whether the corresponding application program is executed for the first time; and
if the corresponding application program is executed for the first time, expressing, by the controller, a character and text for recommending execution of a help function provided for a description of the corresponding application program.

45. The method of claim 44, further comprising the steps of:
expressing a selection button list along with a character and text for recommending execution of the help function provided for a description of the corresponding application program; and
if a predetermined selection button is selected from the selection button list, expressing feedback information mapped to the selected selection button.

46. The method of claim 45, wherein the feedback information expression step comprises the steps of:
if a button for approving execution of the help function is selected from the selection button list, expressing a happy-expression character and text indicating execution approval for the help function; and
if a button for denying execution of the help function is selected from the selection button list, expressing a sad-expression character and text indicating execution denial for the help function.

47. The method of claim 45, wherein the expressed character and text disappear after a lapse of a predetermined time, or if a predetermined key is input.

48. A method for processing an application program-related event in a wireless terminal, the method comprising the steps of:
upon occurrence of a morning call change event collected by a controller, determining, by the controller, whether the morning call change event has been executed a predetermined number of times or more for a predetermined time range in every time period; and
if the morning call change event has been executed a predetermined number of times or more for a predetermined time range in every time period, setting, by the controller, an alarm event for recommending a change in the morning call if the morning call is not changed for a predetermined time range in a next time period.

49. The method of claim 48, wherein the predetermined time range comprises one of a time range spanning from a first time preceding a time at which the morning call is last changed, until the time at which the morning call is last changed, a time range spanning from the time at which the morning call is last changed, until a second time following the time at which the morning call is last changed, and a time range spanning from the first time to the second time.

50. A method for processing an application program-related event in a wireless terminal, the method comprising the steps of:
upon occurrence of an alarm event, collected by a controller, determining, by the controller, a type of the alarm event;
if the alarm event is an alarm event for recommending a change in the morning call if the morning call has not been changed for a predetermined time range in a next time period after it has been changed a predetermined number of times or more for the predetermined time range in every time period, analyzing, by the controller, a record of the changed morning call to determine whether the morning call has been changed for the predetermined time range; and if the morning call has not been changed for the predetermined time range, expressing, by the controller, a character and text for recommending a change in the morning call.

51. The method of claim 50, further comprising the steps of:
    expressing a selection button list along with a character and text for recommending a change in the morning call; and
    if a predetermined selection button is selected from the selection button list, expressing feedback information mapped to the selected selection button.

52. The method of claim 51, wherein the feedback information expression step comprises the steps of:
    if a button for approving a change in the morning call is selected from the selection button list, expressing an image and text for changing a morning call time, and expressing a happy-expression character and text indicating approval of the change in the morning call if the morning call time is changed; and
    if a button for denying a change in the morning call is selected from the selection button list, expressing a sad-expression character and text indicating denial of the change in the morning call.

53. A method for processing an application program-related event in a wireless terminal, the method comprising the steps of:
    upon occurrence of an alarm event, collected by a controller determining, by the controller, a type of the alarm event;
    if the alarm event is an alarm event for recommending execution of a recently infrequently executed application program, analyzing, by the controller, an execution record of the corresponding application program to determine whether there is any recently infrequently executed application program; and
    if there is a recently infrequently executed application program, expressing, by the controller, a character and text for recommending execution of the corresponding application program.

54. The method of claim 53, further comprising the step of:
    determining the recently infrequently executed application program by comparing the number of executions for each application program executed for a first time period and the number of executions for each application program executed for a second time period, with a threshold number, and selecting an application program, the number of executions for which is less than or equal to the threshold number.

55. The method of claim 53, further comprising the steps of:
    expressing a selection button list along with a character and text for recommending execution of the corresponding application program; and
    if a predetermined selection button is selected from the selection button list, expressing feedback information mapped to the selected selection button.

56. The method of claim 55, wherein the feedback information expression step comprises the steps of:
    if a button for approving execution of the corresponding application program is selected from the selection button list, expressing a happy-expression character and text indicating execution approval for the corresponding application program; and
    if a button for denying execution of the corresponding application program is selected from the selection button list, expressing a sad-expression character and text indicating execution denial for the corresponding application program.

57. A method for processing an application program-related event, collected by the controller, in a wireless terminal, the method comprising the steps of:
    upon occurrence of an application program execution event, identifying, by the controller, information on the corresponding application program;
    determining, by the controller, whether the number of executions for the corresponding application program executed for a second time period in a first time period is greater than or equal to a threshold number; and
    if the number of executions is greater than or equal to the threshold number, setting, by the controller, an alarm event for recommending execution of the corresponding application program if the corresponding application program is not executed for a third time period after the corresponding application program is executed a predetermined number of times or more for the second time period in the first time period.

58. The method of claim 57, wherein the second time period is included in the first time period.

59. The method of claim 57, wherein the third time period is shorter than the first time period.

60. A method for processing an application program-related event, collected by a controller, in a wireless terminal, the method comprising the steps of:
    upon occurrence of an alarm event, determining, by the controller, a type of the alarm event;
    if the alarm event is an alarm event for recommending execution of a corresponding application program if the corresponding application program has not been executed for a third time period after it has been executed a predetermined number of times or more for a second time period in a first time period, analyzing, by the controller, an application program record to determine whether the corresponding application program has been executed for the third time period after it has been executed a predetermined number of times or more for the second time period in the first time period; and
    if the corresponding application program has not been executed for the third time period, expressing, by the controller, a character and text for recommending execution of the corresponding application program.

61. The method of claim 60, further comprising the steps of:
    expressing a selection button list along with a character and text for recommending execution of the corresponding application program; and
    if a predetermined selection button is selected from the selection button list, expressing feedback information mapped to the selected selection button.

62. The method of claim 61, wherein the feedback information expression step comprises the steps of:
    if a button for approving execution of the corresponding application program is selected from the selection button list, expressing a happy-expression character and text indicating execution approval for the corresponding application program; and
    if a button for denying execution of the corresponding application program is selected from the selection button list, expressing a sad-expression character and text indicating execution denial for the corresponding application program.

63. A method for processing an application program-related event in a wireless terminal, the method comprising the steps of:
when an occurrence time of an alarm event is reached, determining, by the controller, a type of the alarm event;
analyzing, by the controller, an application program-related record for the corresponding alarm event; and
expressing, by the controller, a character and text mapped to the analysis result for the application program-related record.

64. The method of claim 63, further comprising the steps of:
expressing a selection button list along with the character and text mapped to the analysis result for the application program-related record; and
if a predetermined selection button is selected from the selection button list, expressing feedback information mapped to the selected selection button with the character and text.

65. The method of claim 63, wherein an alarm event time for the alarm event is reset after a predetermined time period.

66. The method of claim 63, wherein the alarm event collects and analyzes an application program-related event, and sets the alarm event if an alarm event setting condition is satisfied.

* * * * *